(12) United States Patent
Quirynen et al.

(10) Patent No.: US 11,840,256 B2
(45) Date of Patent: Dec. 12, 2023

(54) GLOBAL MULTI-VEHICLE DECISION MAKING SYSTEM FOR CONNECTED AND AUTOMATED VEHICLES IN DYNAMIC ENVIRONMENT

(71) Applicant: Mitsubishi Electric Research Laboratories, Inc., Cambridge, MA (US)

(72) Inventors: Rien Quirynen, Somerville, MA (US); Stefano Di Cairano, Newton, MA (US); Shreejith Ravikumar, Warren, MA (US); Akshay Bhagat, Northville, MI (US); Eyad Zeino, Northville, MI (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 192 days.

(21) Appl. No.: 17/389,722

(22) Filed: Jul. 30, 2021

(65) Prior Publication Data
US 2023/0050192 A1    Feb. 16, 2023

(51) Int. Cl.
*B60W 60/00*    (2020.01)
*G05B 13/02*    (2006.01)
(Continued)

(52) U.S. Cl.
CPC .. *B60W 60/0015* (2020.02); *B60W 60/00276* (2020.02); *G05B 13/028* (2013.01);
(Continued)

(58) Field of Classification Search
CPC ....... B60W 60/0015; B60W 60/00276; B60W 2300/12; G05B 13/028
See application file for complete search history.

(56) References Cited

PUBLICATIONS

Schouwenaars et al, "Mixed Integer Programming for Multi-Vehicle Path Planning", 2001, European Control Conference (ECC) (Year: 2001).*

(Continued)

*Primary Examiner* — Hussein Elchanti
*Assistant Examiner* — Kenneth M Dunne
(74) *Attorney, Agent, or Firm* — Gennadiy Vinokur; Hironori Tsukamoto

(57) ABSTRACT

A global multi-vehicle decision making system is disclosed for providing real-time motion planning and coordination of one or multiple connected and automated and/or semi-automated vehicles (CAVs) in an interconnected traffic network that includes one or multiple non-controlled vehicles (NCVs), one or multiple conflict zones and one or multiple conflict-free road segments. The system includes a receiver configured to acquire infrastructure sensing signals, at least one memory configured to store map and programs, and at least one processor configured to perform steps of formulating a global mixed-integer programming (MIP) problem using the infrastructure sensing signals, computing a motion plan for each CAV and each NCV in the traffic network by solving the global MIP problem, computing an optimal sequence of entering/exiting times and a sequence of average velocities for each CAV and each NCV, and computing a velocity profile and/or one or multiple planned stops for each CAV.

22 Claims, 23 Drawing Sheets

(51) Int. Cl.
  *G05D 1/00* (2006.01)
  *G05D 1/02* (2020.01)
  *G08G 1/0967* (2006.01)

(52) U.S. Cl.
  CPC ......... *G05D 1/0088* (2013.01); *G05D 1/0214* (2013.01); *G05D 1/0274* (2013.01); *G08G 1/096708* (2013.01); *G08G 1/096783* (2013.01); *B60W 2300/12* (2013.01); *B60W 2420/42* (2013.01); *B60W 2420/52* (2013.01); *B60W 2520/06* (2013.01); *B60W 2520/10* (2013.01); *B60W 2520/12* (2013.01); *B60W 2552/05* (2020.02); *B60W 2552/10* (2020.02); *B60W 2554/4026* (2020.02); *B60W 2554/4029* (2020.02); *B60W 2554/4041* (2020.02); *B60W 2554/4042* (2020.02); *B60W 2554/4043* (2020.02); *B60W 2554/4044* (2020.02); *B60W 2556/45* (2020.02)

(56) References Cited

PUBLICATIONS

Li et al, "Recasting and Optimizing intersection automation as a connected and automated vehicle (CAV) scheduling problem: A sequential branch and bound search approach in phase-time-traffic hypernetwork", 2017, elsevier, Transportation research Part B 105, (Year: 2017).*

Hu et al, "Synchronizing vehicles for multi-vehicle and one-cargo transportation", 2018, elsevier, Computer and industrial engineering 119. (Year: 2018).*

Guanetti et al. Control of connected and automated vehicles: state of the art and future challenges.

Austin et al. multilane automated driving with optimal control and mixed integer programming.

* cited by examiner

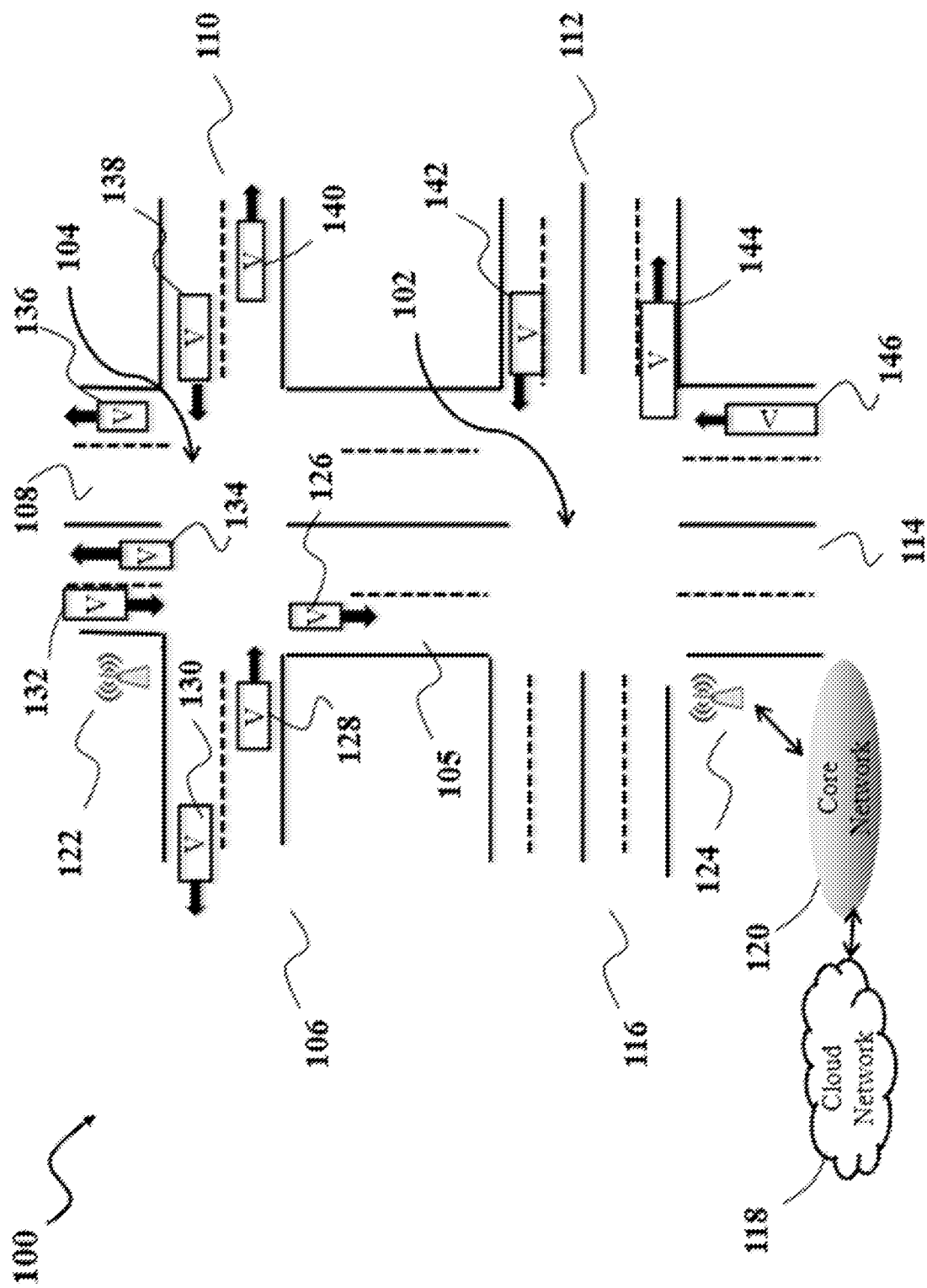

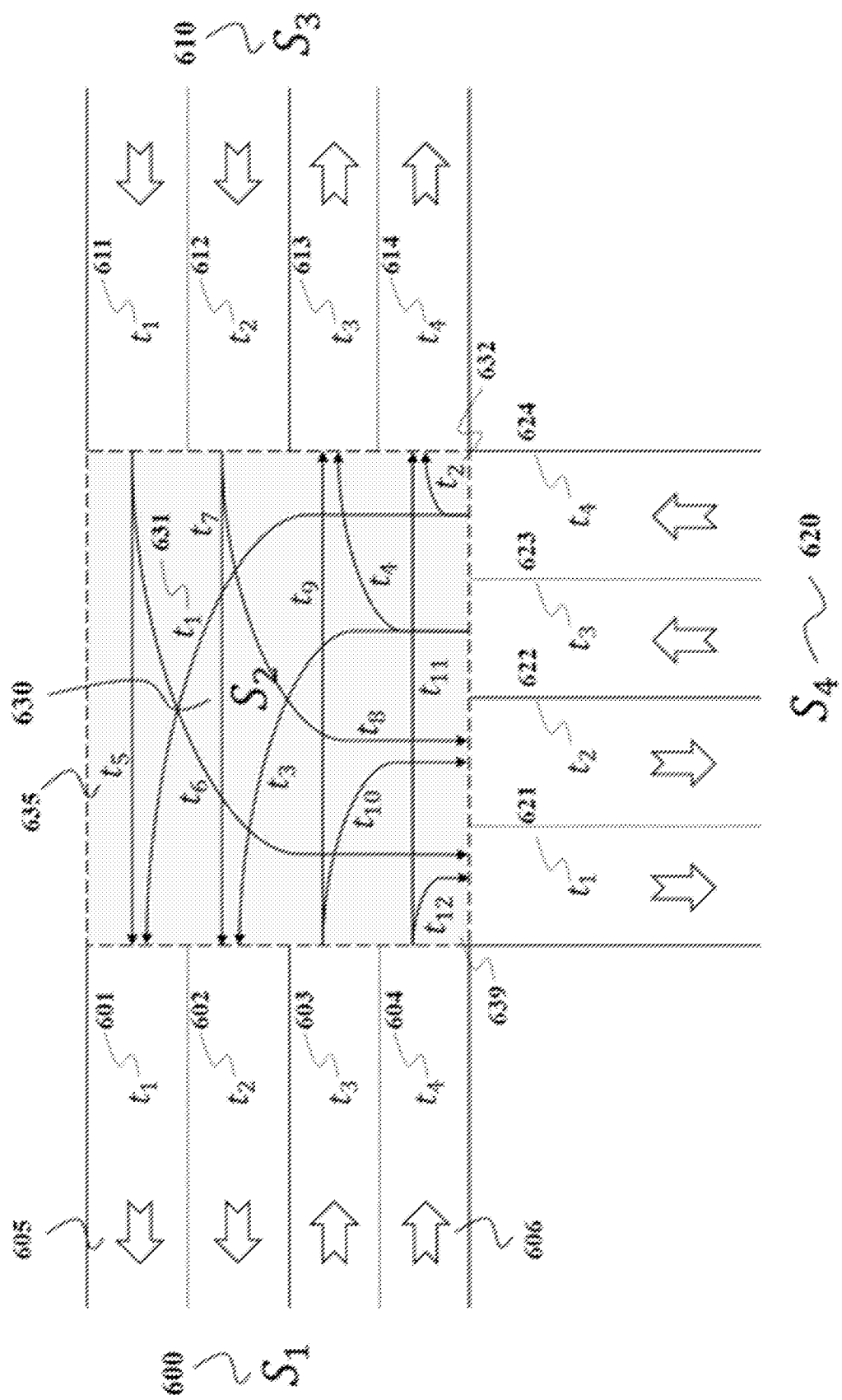

Safety constraints conflict zones: for each road segment $j$ that is a conflict zone, if vehicle $i$ and vehicle $k$ are predicted to drive on conflicting tracks within road segment $j$, then vehicle $i$ exits before vehicle $k$ enters or vehicle $k$ exits before vehicle $i$ enters $$\left(t_{out}^{i,j} \leq t_{in}^{k,j} - \epsilon\right) \vee \left(t_{out}^{k,j} \leq t_{in}^{i,j} - \epsilon\right) \quad 811$$

$$||| \sim 815$$

Safety constraints conflict zones: example reformulation of constraints using additional binary variables and big-M formulation $$\forall i \in \mathcal{I}_c, j \in \mathcal{C}, k \in \{l \in \mathcal{I}_c, l \leq i-1\} \cup \mathcal{I}_{nc}:$$

$$\left(t_{out}^{i,j} - t_{in}^{k,j} - M b^{i,j,k}\right) \leq -\epsilon,$$
$$\left(t_{out}^{k,j} - t_{in}^{i,j} + M b^{i,j,k}\right) \leq M - \epsilon, \quad 821$$

Fig. 8B

Occupancy constraints road segments: for each road segment $j$, if vehicle $i$ and vehicle $k$ are planned or predicted to drive on the same track within road segment $j$, then vehicle $i$ cannot overtake vehicle $k$ or vehicle $k$ cannot overtake vehicle $i$ without any lane change(s)

$$\left( t_{in}^{i,j} \leq t_{in}^{k,j} - \epsilon \wedge t_{out}^{i,j} \leq t_{out}^{k,j} - \epsilon \wedge t_{in}^{i,j} \leq t_{in}^{k,j} - \epsilon \right)$$
$$\vee \left( t_{in}^{k,j} \leq t_{in}^{i,j} - \epsilon \wedge t_{out}^{k,j} \leq t_{out}^{i,j} - \epsilon \wedge t_{in}^{k,j} \leq t_{in}^{i,j} - \epsilon \right)$$

$\equiv$ ~ 835

Occupancy constraints road segments: example reformulation of constraints using additional binary variables and big-M formulation $\forall i \in \mathcal{I}_c, j \in \mathcal{F}, k \in \{\ell \in \mathcal{I}_c, \ell \leq i-1\} \cup \mathcal{I}_{nc}:$
$(t_{in}^{i,j} - t_{in}^{k,j} - M b^{i,j,k}) \leq -\epsilon,$
$(t_{in}^{i,j} - t_{in}^{k,j} + M b^{i,j,k}) \leq M - \epsilon,$
$(t_{out}^{i,j} - t_{out}^{k,j} - M b^{i,j,k}) \leq -\epsilon,$
$(t_{out}^{i,j} - t_{out}^{k,j} + M b^{i,j,k}) \leq M - \epsilon,$ $\forall i \in \mathcal{I}_c, j \in \mathcal{F}, k \in \{\ell \in \mathcal{I}_c, \ell \leq i-1\} \cup \mathcal{I}_{nc}:$
$1 = \psi^i(j) = \psi^k(j):$
$(t_{in}^{k,j} - t_{in}^{i,j} - M b^{i,j,k}) \leq -\epsilon,$
$(t_{in}^{k,j} - t_{in}^{i,j} + M b^{i,j,k}) \leq M - \epsilon,$

Fig. 8C

GLOBAL MULTI-VEHICLE DECISION MAKING SYSTEM FOR CONNECTED AND AUTOMATED VEHICLES IN DYNAMIC ENVIRONMENT

TECHNICAL FIELD

The present disclosure relates generally to optimization-based control, and more particularly to methods and apparatus of optimization-based global multi-vehicle decision making and motion planning for connected and automated vehicles in a dynamic environment within a transportation network.

BACKGROUND

Automated transportation systems, even in the case of partial automation, lead to reduced road accidents and more efficient usage of the road network. Therefore, connected and automated vehicles (CAVs) show large promises for improving safety and traffic flow, and as a consequence for reducing congestion, travel time, emissions and energy consumption. While this has been known for decades, most of the successful developments have been accomplished in recent years due to the technological advances in sensing, computing, control and connectivity. While the on-road scenarios often are highly dynamic, i.e, the vehicle participants and their behavior changes rapidly and significantly, vehicle-to-vehicle (V2V) and vehicle-to-infrastructure (V2I) communication, also known as vehicle-to-everything (V2X) communication for short, enables advanced and efficient planning and decision making by providing access to real-time information on all the vehicles in a certain planning area.

Significant progress has been made in planning and control for automated driving, which typically involves a multi-layer guidance and control architecture implemented on-board. At the highest level, an intelligent navigation system finds a route through the transportation network from the current vehicle position to the requested destination. A decision maker selects the appropriate driving behavior at any point of time, given the route plan, the current environment condition, and the behavior of the other traffic participants, e.g., using automata combined with set reachability or formal languages and optimization. Given the target behavior, including lane following, lane changing or stopping, a motion planning algorithm computes a dynamically feasible and safe trajectory that can be tracked in real-time by a low-level feedback controller. A popular approach uses the combination of a sampling-based motion planner and model predictive control (MPC) for reference tracking. For CAVs, the guidance and control architecture may look similar to that for standard automated driving, but some of the modules may be implemented in the infrastructure, e.g., in mobile edge computers (MECs) and provide decisions to multiple vehicles in the area, while other modules may still be implemented on board of each vehicle individually.

Coordination of cooperative agents allows to reach a socially optimal behavior for the transportation network. One example describes a first come, first serve (FCFS) policy for autonomous traffic management at intersections. More recently, coordination strategies for intersection control have been proposed using nonlinear optimization or using mixed-integer linear programming (MILP). The latter has been extended to a distributed MILP algorithm for scheduling a grid of interconnected intersections. In addition, an MILP-based approach for on-ramp merging of CAVs was proposed. Alternative techniques for coordination of CAVs can be found in recent works, where it can be also noted that the intersection and merging control problems are very similar in nature. There is need to develop an advanced global multi-vehicle decision making system.

SUMMARY

This invention focuses on the global multi-vehicle decision making and motion planning for CAVs, which provides targets and operational information to a local motion planning and tracking system implemented separately in each automated vehicle, and in the presence of on-road vehicles that are conventional, i.e., manual, referred to as non-controlled vehicles (NCVs). Embodiments of this invention include an MILP-based global multi-vehicle decision making system for vehicles in an interconnected network of generalized conflict zones, including both intersections and merging points. Unlike the prior art for all-autonomous vehicle coordination, this invention focuses on the more realistic scenario that includes mixed traffic of both CAVs and human-driven NCVs. For this purpose, physical traffic lights and/or standard priority rules are needed for human-driven vehicles to cross intersections in the mixed traffic scenario. The proposed constrained optimization method directly incorporates the transportation of people and goods, given a real-time sequence of vehicle routing information from a high-level algorithm.

Embodiments of this invention are based on a mixed-integer optimization method for global multi-vehicle decision making and motion planning of connected and automated vehicles (CAVs) in an interconnected network of generalized conflict zones, including both intersections and merging points, and in the presence of on-road vehicles that are conventional, i.e., manual, referred to as non-controlled vehicles (NCVs). The proposed approach computes a schedule consisting of target velocities and times to enter and exit the road segments in a prediction window for each vehicle towards its desired destination, under safety constraints for conflict zones and occupancy constraints for road segments, and while optimizing the overall time and energy efficiency across all controlled vehicles. As opposed to existing approaches in the prior art, the proposed system and method supports

- a transportation network of conflict zones, i.e., including one or multiple merging points and/or intersections,
- mixed traffic including both autonomous and human-driven vehicles, where position, speed and heading for each vehicle is available through V2X communication, but only some of the vehicles are controlled in a local area of multiple interconnected conflict zones,
- global multi-vehicle decision making and motion planning based on optimization of multiple objectives, e.g., travel time, waiting time and energy efficiency,
- coarse high-level motion planning for CAVs, using future routing information for transportation of people and goods.

Some embodiments of the invention are based on a multi-layer guidance and control architecture, in which some modules are implemented on board of each CAV and other modules operate as centralized in the infrastructure, e.g., in a mobile edge computer, in order to exploit V2X connectivity. Specifically, in each CAV, given a target behavior representative of actions such as lane following, lane changing or stopping, a motion planning algorithm computes a dynamically feasible and safe trajectory that can be tracked in real-time by the vehicle controller. Some embodiments are based on a probabilistic sampling-based motion planner, and an MPC algorithm for reference tracking, in each CAV.

Differently from fully autonomous vehicles, embodiments of the invention are based on the realization that, for the case of CAVs, the target behavior for the motion planning algorithm should not be computed separately for each vehicle by an on-board decision making algorithm, but rather for all vehicles at the same time in a global multi-vehicle decision making module. Specifically, given real-time information on the environment from the mapping and navigation module, e.g., real-time state and routing information for each of the CAVs in a local area of multiple interconnected conflict zones, the global multi-vehicle decision making module determines the target behaviors for all CAVs in that local area, at the same time. Note that the routing information for each CAV may be computed by a centralized mapping and navigation module or by an on-board mapping and navigation module in each local CAV individually.

Embodiments of the invention perform coordination and scheduling for vehicles within a network of road segments, consisting of one or multiple road segments that are conflict zones and one or multiple road segments that are conflict-free zones. Examples of conflict zones are intersections and/or merging points, which connect multiple lanes and/or road segments. Examples of conflict-free zones are standard road segments, consisting of one or multiple lanes that allow either a single direction or multiple directions of traffic.

Embodiments of the invention are based on the realization that the information for the global multi-vehicle decision making module is available through communication between vehicles and infrastructure, i.e., V2X, of data acquired by sensors in both CAVs and NCVs, and possibly acquired by additional sensors in the infrastructure. Specifically, the input information from V2X communication to the global multi-vehicle decision making system can include

- map information for the transportation network that is considered by the global decision making module, including lane information for each road segment and conflict zone, i.e., merging points and/or intersections.
- for each vehicle, i.e., both CAVs and NCVs in a local area of the transportation network, the current state of the vehicle, e.g., including the current position, heading and velocity.
- for each NCV, a possibly short-term route prediction defined as a sequence of future road segments towards its desired destination, starting from the road segment in which the NCV is currently located. The length of the route, i.e., the number of road segments in the route prediction can be either fixed or time-varying, depending on the information that is available.
- for each CAV, a relatively long-term route plan determined as a sequence of future road segments towards its desired destination, starting from the road segment in which the CAV is currently located. The length of the planned route, i.e., the number of road segments in the future route plan can be either fixed or time-varying, depending on the information that is available from the mapping and navigation module for each CAV.
- for each CAV, and for each road segment in its future planned route, a set of planned stop durations for each road segment along that route, e.g., for transportation of people and/or goods.

Similarly, the output information from the global multi-vehicle decision making system can include

- for each CAV, a sequence of predicted average velocities for the road segments along its future planned route in the transportation network.
- for each CAV, a sequence of predicted entering times for the road segments along its future planned route in the transportation network.
- for each CAV, a sequence of predicted exit times for the road segments along its future planned route in the transportation network.

The length of the prediction window, i.e., the length of the route, can be chosen to be constant for all vehicles, it can be chosen individually for each vehicle, or it can be time-varying and different for each vehicle, depending on the information that is available to the global multi-vehicle decision making system.

Embodiments of the invention are based on the realization that, depending on the infrastructure system, obtaining a precise prediction for the route of each NCV may prove challenging. Because of this, in some embodiments of the invention, the global multi-vehicle decision making module is implemented in a receding horizon fashion based on the most recent information. Embodiments of the invention are based on the realization that an approximate short-term route prediction for NCVs is sufficient, e.g., until the next conflict zone, and any discrepancies in the predictions can be adjusted by the intrinsic feedback mechanism of the receding horizon strategy. For example, an update period of 1-2 seconds allows for real-time computation of the global multi-vehicle decision making system, while providing sufficiently fast updates to account for erroneous prediction of NCV behaviors.

Some embodiments of the invention are based on the realization that the presence of other traffic participants, e.g., including bicycles and pedestrians, can be handled as obstacles by on-board modules in the multi-layer guidance and control architecture for each CAV, e.g., the motion planning and/or the vehicle control algorithm. Due to their relatively smaller computational cost, compared to that for the global multi-vehicle decision making system, the motion planning and vehicle control algorithms can be run at a relatively fast sampling rate in order to have a fast reaction time to unexpected changes in the behavior of the other traffic participants, e.g., including bicycles and pedestrians. For example, vehicle control algorithms are often executed with an update period of 50-100 milliseconds.

The proposed global multi-vehicle decision making module is targeted at small-to-medium-scale transportation networks, e.g., a local area of multiple interconnected conflict zones with potential for congestion. Some embodiments of the invention include transportation tasks for CAVs of people and/or goods, e.g., groceries or packages, using a potentially varying number of CAVs that operate in the same environment as potentially many non-controlled traffic participants. The task assignment, i.e., the objectives that each CAV must accomplish, can be performed by a separate task assignment module, e.g., based on the solution of a constrained optimization problem. Based on the assigned tasks, the navigation module determines the route for CAVs, either centralized or locally in each CAV, and the route information can be updated in real-time. Accounting for computational tractability, including the receding-horizon computation, and effectiveness in practical applications, embodiments of the invention can handle at least 1-10 CAVs, 0-30 NCVs in a local transportation network of up to 10 conflict zones and several connected road segments.

Embodiments of the invention are based on the realization that the global multi-vehicle decision making module can be implemented by solving a constrained optimization problem to compute the coarse motion plan for each of the CAVs, given the input information from V2X communication. In some embodiments of the invention, the constrained optimization problem can be a mixed-integer programming (MIP) problem, for example, a mixed-integer linear programming (MILP) or mixed-integer quadratic programming (MIQP) problem. In some embodiments of the invention, the MIP problem at each sampling instant of the global multi-vehicle decision making system can be solved by a global optimization algorithm, for example, including branch-and-bound, branch-and-cut and branch-and-price methods. In other embodiments of the invention, heuristic techniques can be used to compute a feasible but suboptimal solution to the MIP, for example, including rounding schemes, the feasibility pump, approximate optimization algorithms, or the use of machine learning.

Further, according to some embodiments of the present invention, a global multi-vehicle decision making system can be implemented for providing real-time motion planning and coordination of one or multiple connected and automated and/or semi-automated vehicles (CAVs) in an interconnected traffic network that includes one or multiple non-controlled vehicles (NCVs), one or multiple conflict zones and one or multiple conflict-free road segments. In this case, the global multi-vehicle decision making system may include a receiver configured to acquire infrastructure sensing signals via road-side units (RSUs), type 1 feedback signals on state and planned future routing information towards one or multiple desired destinations for connected and automated vehicles (CAVs), and type 2 feedback signals on state and predicted future routing information for non-controlled vehicles (NCVs); at least one memory configured to store map information and computer-executable programs including a global multi-vehicle decision making program; and at least one processor, in connection with the at least one memory, configured to perform steps of: formulating a global mixed-integer programming (MIP) problem based on the infrastructure sensing signals, the type 1 and type 2 feedback signals and the map information; computing a motion plan for each CAV and each NCV in an interconnected traffic network by solving the global MIP problem; computing an optimal sequence of entering and exiting times and a sequence of average velocities for each CAV and each NCV in each road segment along a planned or predicted future route within a transportation network; computing a velocity profile and/or one or multiple planned stops for each CAV over a prediction time horizon; and a transmitter configured to transmit, to each of the CAVs, the velocity profile and/or the one or multiple planned stops to a multi-layer guidance and control architecture of each CAV in the interconnected traffic network.

In some embodiments of the global multi-vehicle decision making system, the optimization problem includes the optimization of one or multiple objectives and enforces one or multiple equality and/or inequality constraints for safety and efficiency for all vehicles in the transportation network. For example, the constraints can include a vehicle motion model, velocity constraints, timing constraints for the route plan or route prediction, safety constraints in conflict zones and occupancy constraints for conflict-free road segments. The objectives can include the minimization of the travel time to reach the end of each segment in the route plan or route prediction, the minimization of the waiting time for each vehicle, the maximization of the average velocity and the minimization of accelerations for energy efficiency.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1 illustrates an example of a traffic scenario in a local area of multiple interconnected conflict zones, and the need for global multi-vehicle decision making of controlled and non-controlled vehicles, according to some embodiments.

FIG. 6A shows an example of (a local area within) a transportation network, consisting of multiple conflict-free road segments, interconnected via a 3-way intersection, and each of the road segments consists of one or multiple track lanes.

FIG. 8B shows an exemplary formulation of safety constraints for each of the conflict zones, that can be used in the MIP problem that is solved by the global multi-vehicle decision making system, according to embodiments of the invention.

FIG. 8C shows an exemplary formulation of occupancy constraints for each of the road segments, that can be used in the MIP problem that is solved by the global multi-vehicle decision making system, according to embodiments of the invention.

DETAILED DESCRIPTION

Figure 2A:
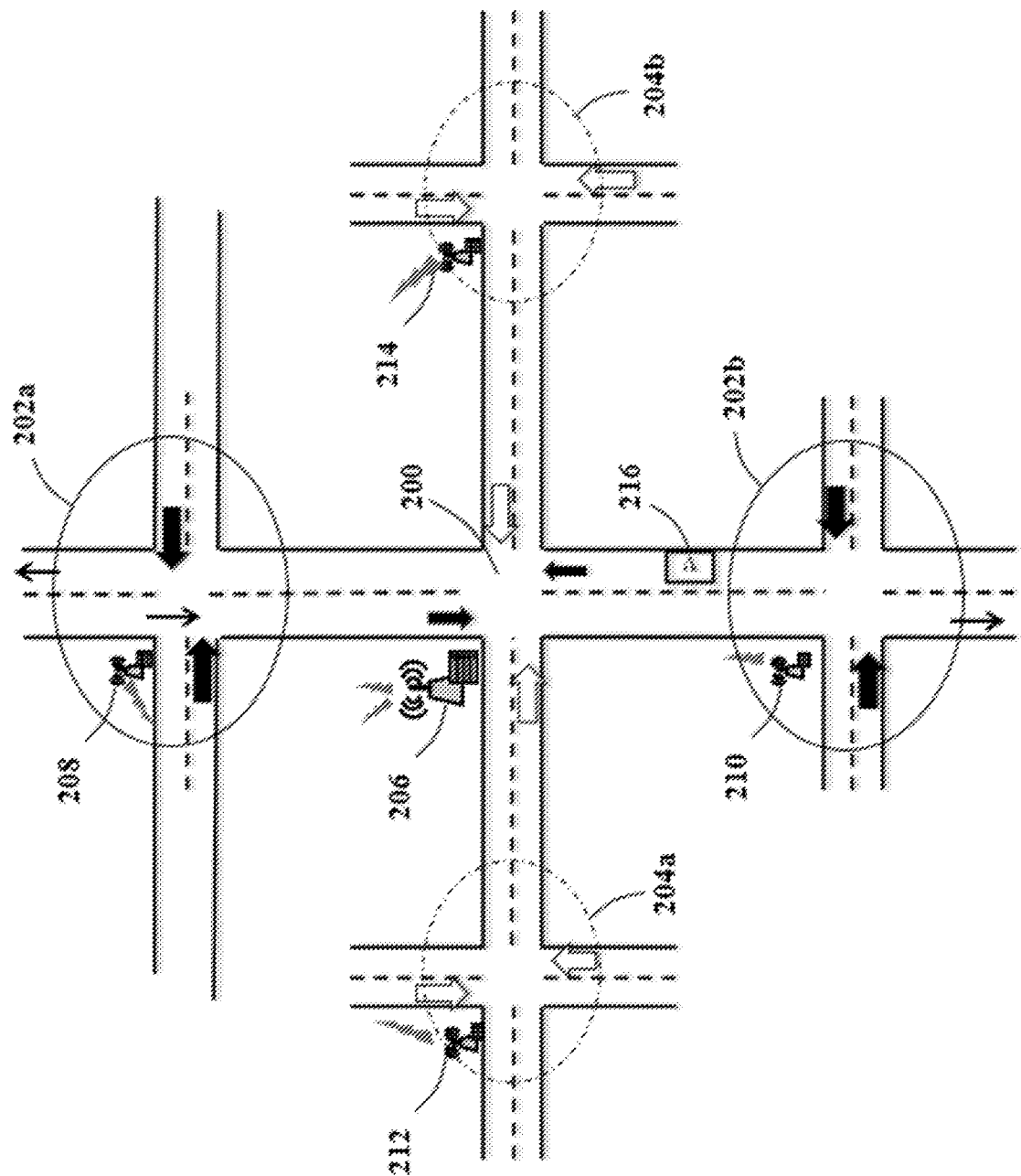
FIG. 2A shows an exemplary schematic diagram of controlling traffic in a local area of multiple interconnected conflict zones based on segment crossing times and average velocities of the vehicles, according to some embodiments.

Some embodiments of the present disclosure provide a system and a method for controlling one or multiple connected and automated vehicles within a transportation network that consists of one or multiple interconnected conflict zones and that includes a dynamic environment, e.g., possibly one or multiple non-controlled vehicles, traffic participants or dynamic obstacles.

FIG. 1 shows an example of a traffic scenario (traffic state) 100 that illustrates the need for global multi-vehicle decision making of controlled and non-controlled vehicles within a local area of multiple interconnected conflict zones, e.g., at interconnected intersections of road segments, according to some embodiments. The interconnected conflict zones include physically interconnected conflict zones and communicably interconnected conflict zones. Examples of physically interconnected conflict zones are intersections or merging points where vehicles can travel from one conflict zone to another conflict zone. Examples of communicably interconnected conflict zones are intersections or merging points that share traffic information from one conflict zone to another conflict zone via communication channels.

The example of a traffic scenario 100 shows an intersection 102 and another intersection 104 which are physically interconnected to each other via road segment 105, and the transportation network includes additional road segments 106, 108, 110, 112, 114 and 116. Embodiments of the invention describe a system and method for global multi-vehicle decision making of vehicles within such a network of road segments, consisting of one or multiple road segments that are conflict zones and one or multiple road segments that are conflict-free zones. Examples of conflict zones are intersections 102-104 and/or merging points, which may connect multiple lanes and/or road segments. Examples of conflict-free zones are standard road segments 105-116, consisting of one or multiple lanes that allow either a single direction or multiple directions of traffic.

FIG. 1 additionally illustrates multiple vehicles 126, 128, 130, 132, 134, 136, 138, 140, 142, 144, 146 and/or other traffic participants within a local area of multiple interconnected conflict zones 102-104 and multiple interconnected conflict-free road segments 105-116. The vehicles in the traffic network, e.g., vehicles 126-146, may each be either an autonomous, semi-autonomous or manually operated vehicle. We further refer to autonomous and/or semi-autonomous vehicles as connected and automated vehicles (CAVs), or simply as controlled vehicles, and we refer to manually operated vehicles or other traffic participants as non-controlled vehicles (NCV). Some examples of the vehicles 126-146 include two-wheeler vehicles, such as motor bikes, four-wheeler vehicles, such as cars, or more than four-wheel vehicles, such as trucks and the like.

The traffic transportation network, including one or multiple interconnected conflict zones and one or multiple interconnected conflict-free road segments, can additionally include one or multiple road-side units (RSUs) for infrastructure-based real-time sensing of the state of vehicles and other traffic participants in a local area around each of the RSUs. FIG. 1 shows one RSU 122 and another RSU 124, a core network 120, and a cloud network 118 to establish an Internet of Vehicles (IoV) environment, including vehicle-to-vehicle (V2V) and vehicle-to-infrastructure (V2I) communication, also known as vehicle-to-everything (V2X) communication, according to some embodiments of the invention.

In some embodiments, the traffic scenario 100 corresponds to a public metropolitan area, where the road segments 105-116 form a (large) number of intersections, such as the intersections 102 and 104. In the metropolitan area, traffic conditions at the intersections 102 and 104 determine traffic flow because traffic congestion usually starts at a conflict zone, such as the intersection 104, and it propagates further to the conflict-free road segments, e.g., road segments 105-116. The traffic conditions at the interconnected conflict zones 102 and 104 are interdependent such that a variation at one conflict zone, e.g., the intersection 104, propagates further to other interconnected conflict zones, such as the intersection 102 (which is also called a neighboring intersection 102 for the intersection 104).

In other embodiments, the traffic scenario 100 can correspond to a private transportation network, e.g., including one or multiple parking areas and interconnected road segments for a valet parking system. Other examples of similar traffic scenarios, including a transportation network with multiple interconnected conflict zones and road segments, are smart distribution centers and/or shipping yards. Examples of types of CAVs include personal vehicles (e.g., in case of the valet parking system), trucks (e.g., in case of the yard management system) or shuttles for pick-up and drop-off of passengers.

Some embodiments are based on the realization that, to establish communication among different vehicles (e.g., the set of vehicles 126-146) in the transportation network, communication between a cloud network 118 and a vehicle 126 on the road segment 105 needs to propagate through the RSU 122 or the RSU 124 and the core network 120 in such a way that a multi-hop communication is established. In some embodiments of the invention, safe mobility of the vehicles 126-146 is controlled by a global multi-vehicle decision making system using a cloud-based and/or edge-based network (i.e., using the cloud network 118 and/or core network 120). In some embodiments of the invention, the global multi-vehicle decision making system is implemented using one or multiple mobile edge computers (MECs), which can be either embedded as part of one or multiple RSUs or they can be separate devices that are connected to the RSUs 122-124, the cloud network 118 and/or core network 120. Embodiments of the invention include the solution of a constrained optimization problem for global multi-vehicle decision making of vehicles in the transportation network, for which the computations can be executed either in the cloud or in one or multiple MECs.

Embodiments of the invention are based on the realization that on-board control devices of the vehicles, such as the vehicle 146, cannot obtain information about neighboring vehicles (such as the vehicle 142), pedestrians and environment conditions that are out of their visible range. For instance, the vehicle 146 traveling on the road 114 intends to cross the intersection 102 after the vehicle 144 (that is bigger in size than the vehicle 142) crosses the intersection 102, and the vehicle 142 (that is a small sized vehicle) is also moving into the intersection 102. In such a scenario, visibility of the vehicle 142 is blocked by the vehicle 144 as shown in FIG. 1. The vehicle 144 prevents the vehicle 142 from getting noticed by the vehicle 146 if communication link between the vehicle 142 and the vehicle 146 is affected or if vehicle 142 and vehicle 146 use different communication protocols. As a result, the vehicle 142 and the vehicle 146 might collide.

In addition, some embodiments of the invention are based on the realization that the multi-hop communication between the cloud network 118 and a vehicle 126 can result in a long communication delay, which may not be acceptable in real-time scenarios of cloud-based vehicle control.

Some embodiments are based on the realization that different communication technologies can be utilized to support vehicular communications. For example, IEEE Dedicated Short-Range Communications/Wireless Access in Vehicular Environments (DSRC/WAVE) standard family for vehicular networks, 3GPP Cellular-Vehicle-to-Anything (C-V2X), and the like. However, due to high cost reasons, it is impractical for vehicles (e.g., the vehicles 126-146) to support more than one short-range communication technologies which leads to compatibility issues among the vehicles to communicate with each other. Therefore, the vehicles equipped with the IEEE DSRC/WAVE cannot communicate with other vehicles equipped with the 3GPP C-V2X, and vice versa. Consequently, the accuracy of real-time control decisions by an on-board, multi-layer guidance and control architecture in each individual vehicle would be severely affected because these real-time decisions would be based on incomplete information of the traffic scenario 100. Instead, embodiments of the invention use a global multi-vehicle decision making module, based on real-time information from each of the vehicles in the transportation network, to ensure safety, time and energy efficiency.

Some embodiments are based on the realization that edge infrastructure devices (e.g., the RSU 122 and the RSU 124) have advantages for controlling multi-vehicle traffic over usage of only the cloud network and/or only the on-board device (including the multi-layer guidance and control architecture). For example, the edge infrastructure devices can be installed at intersections or merging points, and they could directly communicate with the vehicles (e.g., the vehicles 126-146) approaching the intersection or merging point. In addition, the edge infrastructure devices can be equipped with multiple communication technologies in order to be able to communicate with all the connected vehicles. Some embodiments of the invention are based on the realization that the edge infrastructure devices are stationary, which enable them in providing reliable communication with vehicles as well as in collecting relatively high-quality environmental data.

Embodiments of the invention are based on the realization that the edge infrastructure devices are capable of continuously monitoring multi-vehicle traffic and the environment for accurate decision making. In some embodiments of the invention, the edge infrastructure devices use additional sensors, e.g., distance range finders, radars, lidars, and/or cameras, as well as sensor fusion technologies in order to accurately detect the state of the vehicles and the dynamic environment, including both connected and non-connected vehicles, autonomous, semi-autonomous and manually operated vehicles and other traffic participants such as bicycles and pedestrians. Accordingly, the edge infrastructure devices are appropriate to use for global multi-vehicle decision making and motion planning.

FIG. 2A shows an example of a transportation network of multiple interconnected conflict zones, i.e., including multiple interconnected intersections 200, 202a, 202b, 204a and 204b. The overall safety, time efficiency and energy efficiency of the traffic flow in this transportation network can be controlled by the global multi-vehicle decision making system, according to embodiments of this invention. In some embodiments of the invention, the global multi-vehicle decision making system computes a coarse motion plan for each CAV in the transportation network along its route from the current position of the CAV to the desired destination of the CAV. The coarse motion plan can include a sequence of entering and exit times and of average velocity values for each CAV in each of the conflict zones and the conflict-free road segments along the CAV's route from its current position to its desired destination, possibly including one or multiple planned intermediate stops along the route of the CAV.

In some embodiments of the invention, the inputs to the global multi-vehicle decision making system can include signals from communication with one or multiple CAVs and/or one or multiple NCVs, and can include signals from communication with one or multiple edge infrastructure devices, e.g., RSUs with additional sensors and sensor fusion capabilities. For example, in FIG. 2A, each of the intersections 200, 202a, 202b, 204a and 204b is equipped with RSUs 206, 208, 210, 212 and 214, respectively. Some embodiments of the invention include the solution of a constrained optimization problem for global multi-vehicle decision making of vehicles in the transportation network, for which the computations can be executed either in the cloud or in one or multiple MECs, which can be either embedded as part of one or multiple RSUs 206, 208, 210, 212 and 214 or they can be separate devices that are connected to one or multiple RSUs 206-214.

In an illustrative example scenario in FIG. 2A, traffic in a north-south direction at the intersections 202a and 202b is more highly congested than traffic in an east-west direction at the intersections 204a and 204b. The global multi-vehicle decision making system controls the planned future timing and velocity trajectories for vehicles (e.g., the vehicle 216) that plan to cross the intersection 200 and plan to travel towards south-north direction of the intersection 202a, which is highly congested. To improve overall safety, time efficiency and energy efficiency of the traffic flow in the transportation network, the global multi-vehicle decision making system could decide that the vehicle 216 should slow down its speed before and/or after crossing the intersection 200, such that the vehicle 216 is predicted to arrive at the intersection 202a at a later time in order to reduce the traffic congestion at the intersection 202a and in order to reduce the overall waiting time for one or multiple of the vehicles in the transportation network.

Figure 2B:
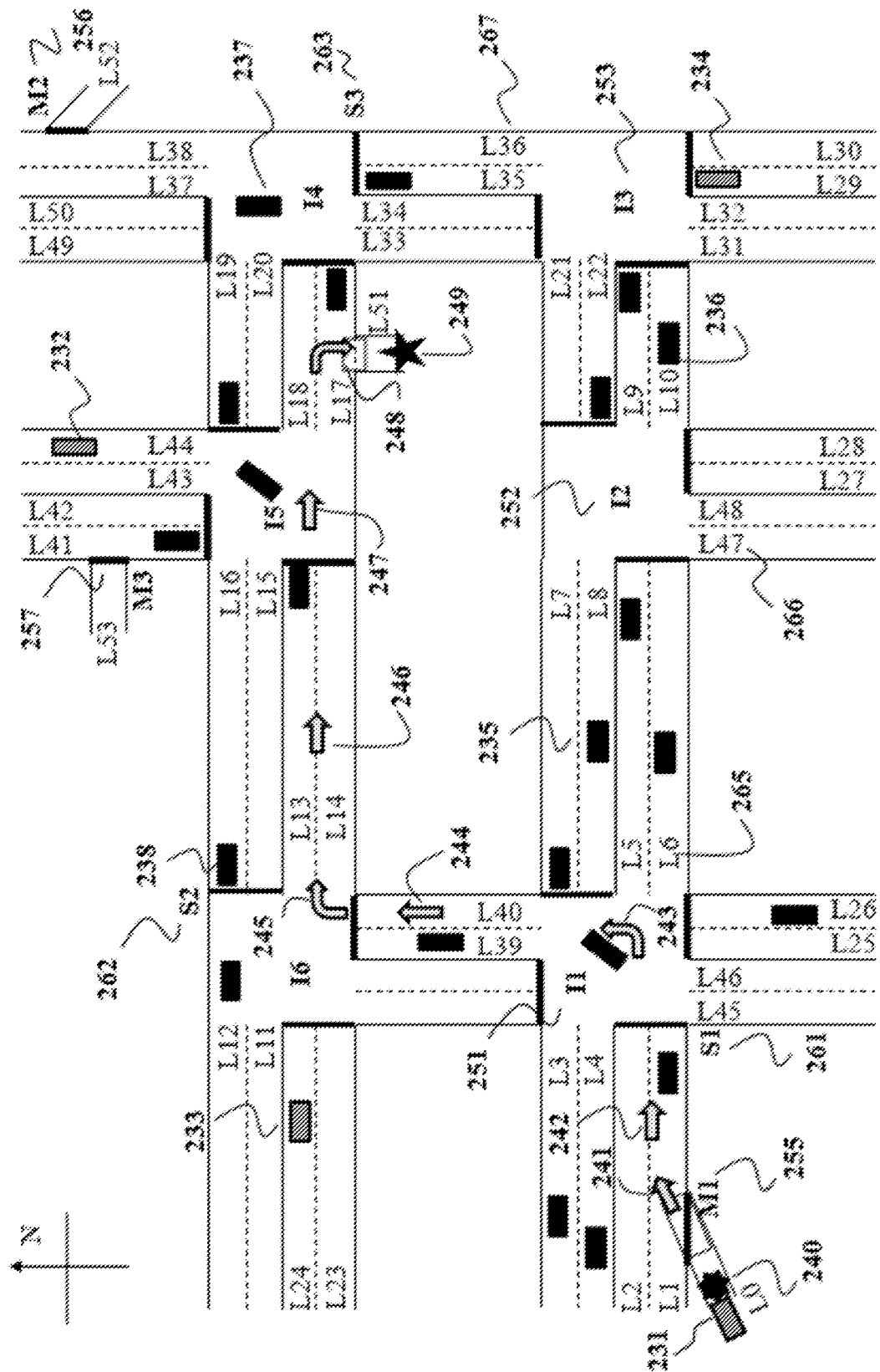
FIG. 2B illustrates a traffic scenario in a local area of interconnected conflict zones, and the routing information for multiple connected and automated vehicles, e.g., for transportation of people and goods, according to some embodiments.

FIG. 2B illustrates an exemplary traffic scene, within a transportation network of multiple interconnected intersections and merging points, for a global multi-vehicle decision making system based on some embodiments of the invention. The FIG. 2B depicts a scenario with one or multiple controlled vehicles, referred to as CAVs, e.g., 231, 232, 233 and 234, and including one or multiple non-controlled traffic participants, such as the NCVs 235, 236, 237 and 238. The transportation network itself may consist of multiple interconnected intersections, such as 251 (I1), 252 (I2) and 253 (I3), as well as multiple interconnected merging points, such as 255 (M1), 256 (M2) and 257 (M3). In the description for embodiments of the invention, both intersections and merging points are referred to as conflict zones. The conflict zones are interconnected by multiple conflict-free road segments that each may consist of one or multiple lanes, for example, 265 (L6), 266 (L47) and 267 (L36). In addition, FIG. 2B depicts stop lines that denote the position for vehicles to potentially wait for a particular time period before entering an intersection, for example, the stop lines 261 (S1), 262 (S2) and 263 (S3).

FIG. 2B additionally illustrates the routing information that may be provided by a routing or navigation module for each of the CAVs, e.g., for the vehicle 231. For the vehicle 231 in current position 240, and with desired destination 249, a routing or navigation module provides the sequence of roads and turns indicated by arrows 241-248 for the vehicle 231. Similarly, the same centralized or different individual routing or navigation modules can provide the sequence of roads and turns from the current position to the desired destination for other vehicles, e.g., for the CAVs 232, 233 and 234. However, it should be noted that the sequence of roads and turns 241-248 by itself does not yet specify a motion plan or a path for the vehicle 231. There are a number of discrete decisions to take such as in what lane the vehicle is to drive, if the vehicle should change lane or stay in the current lane, if the vehicle should start decelerating to stop at the stop line or not, if the vehicle is allowed to cross the intersection, and so on. Furthermore, there are a number of continuous decisions to make, such as the timed sequence of positions and orientations that the vehicle should achieve on the travel from its initial point to its destination. These decisions highly depend on the current traffic at the moment when the vehicle reaches the corresponding location, which is in general unknown to a routing module due to the uncertainty of traffic motion and uncertainty of the moment at which the vehicle will reach the location.

In some embodiments of the present disclosure, a motion plan, which includes a sequence of one or multiple of the aforementioned discrete and/or continuous decisions along the route from the current position to the desired destination, can be computed by the global multi-vehicle decision making system for one or multiple CAVs, e.g., 231-234. In some embodiments of the invention, the global multi-vehicle decision making system relies on real-time communication to allow for coordination between the vehicles (V2V) and/or communication between a smart infrastructure system and the vehicles (V2X). In some embodiments of the invention, the global multi-vehicle decision making system computes the motion plan for each of the CAVs by solving one or multiple constrained optimization problems, e.g., a constrained mixed-integer programming problem.

According to some embodiments, the global multi-vehicle decision making module is targeted at small-to-medium-scale transportation networks, e.g., a local (public or private) area of multiple interconnected conflict zones. Some embodiments of the invention include transportation tasks for CAVs of people and/or goods, e.g., pick-up and drop-off of passengers, groceries or other packages, using a potentially varying number of CAVs that operate in the same environment as potentially many non-controlled traffic participants. The task assignment, i.e., the objectives that each CAV must accomplish, can be performed by a separate task assignment module, e.g., based on the solution of a potentially large constrained (mixed-integer) optimization problem. Based on the assigned tasks, the navigation module determines the route for each of the CAVs, either centralized or locally in each CAV, and the route information can be updated in real time. Accounting for computational tractability, including the receding-horizon computation, and effectiveness in practical applications, embodiments of the invention can handle at least 1-10 CAVs, 0-30 NCVs in a local transportation network of up to 10 conflict zones and several connected road segments.

Figure 3:
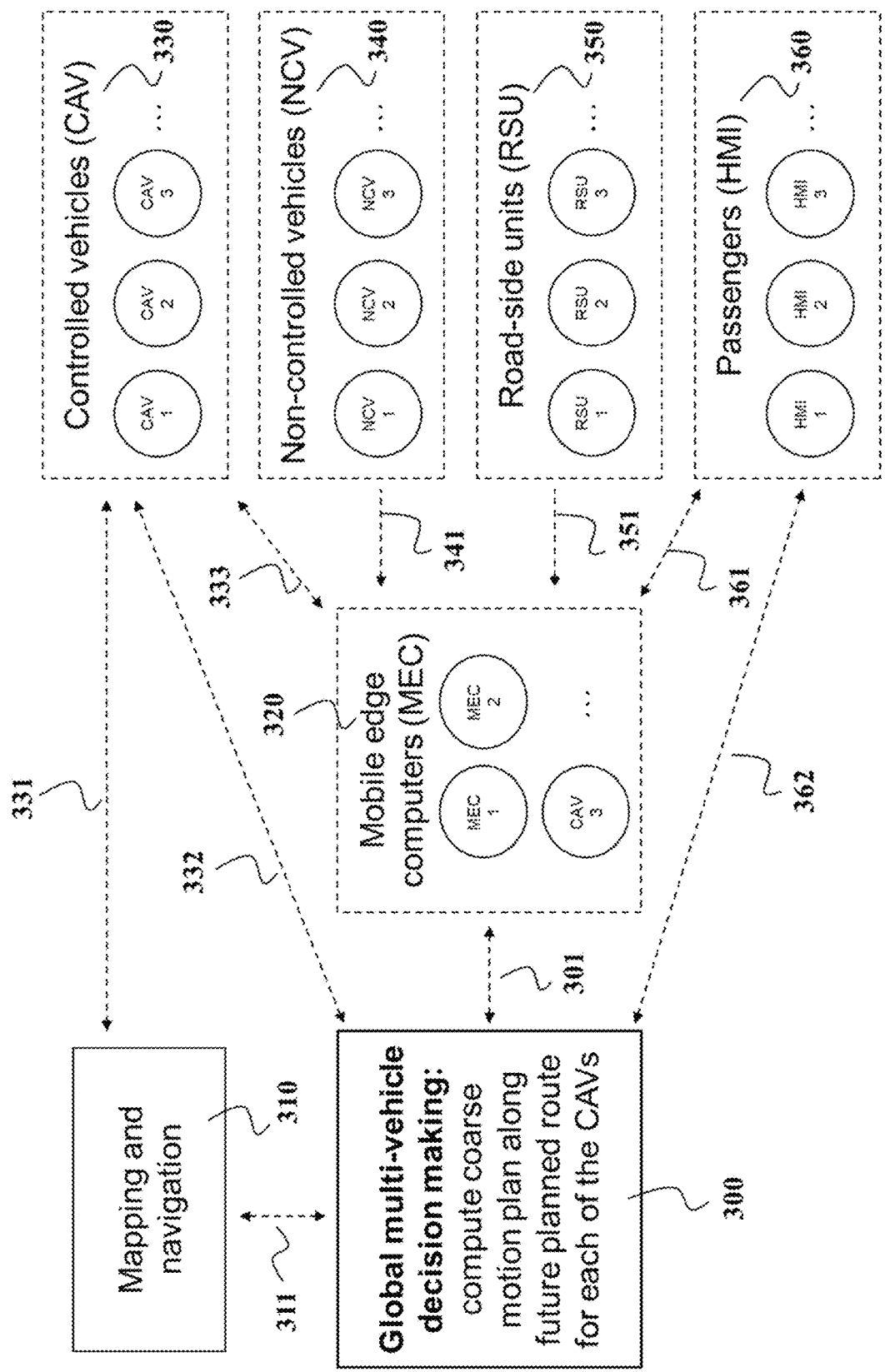
FIG. 3 shows a schematic diagram of possible interactions between the global multi-vehicle decision making system and a mapping and navigation system, one or multiple controlled and non-controlled vehicles, road-side units, passengers and mobile edge computers, according to some embodiments of the invention.

FIG. 3 shows a schematic diagram of possible interactions between the global multi-vehicle decision making system 300 and a mapping and navigation system 310, one or multiple controlled (CAV) 330 and non-controlled vehicles (NCV) 340, one or multiple road-side units (RSU) 350, one or multiple passengers (HMI) 360 and/or one or multiple mobile edge computers (MEC) 320. According to some embodiments of the invention, the mapping and navigation system computes real-time routing information for each of the CAVs, either centralized or decentralized (e.g., on a device embedded as part of the CAV), from a current position to a desired destination or a desired sequence of destinations for each CAV. This routing information can be communicated from the mapping and navigation module to the global multi-vehicle decision making system 311 and/or to each of the individual CAVs 331. Similarly, the mapping and navigation system can receive up to date information either from the global multi-vehicle decision making system 311 and/or from each of the individual CAVs 331.

According to some embodiments of the invention, the global multi-vehicle decision making system computes a coarse motion plan for each CAV in the transportation network along its route from the current position of the CAV to the desired destination or sequence of desired destinations of the CAV. This motion plan is then communicated from the global multi-vehicle decision making system to each of the controlled vehicles (CAV) directly 332, or instead indirectly via communication with one or multiple MECs 301 that provide up to date information from the global multi-vehicle decision making system to the CAVs 333. Similarly, according to embodiments of the invention, the global multi-vehicle decision making system relies on real-time information that can be communicated either directly from the CAVs 330, NCVs 340, RSUs 350 and HMIs 360 or indirectly via 301 from the MECs 320. In some embodiments of the invention, the MECs can collect real-time information about the state of traffic participants and of the dynamic environment in a local area of the transportation network, by communicating with CAVs 333, NCVs 341, RSUs 351 and human passengers 361 that are currently present in a local area of the transportation network.

Some embodiments of the invention are based on the realization that the number of MECs 320, CAVs 330, NCVs 340, RSUs 350 and HMIs 360 could vary at each control time step for the global multi-vehicle decision making system 300. Most importantly, the number of NCVs and HMIs can vary significantly as traffic participants and potential passengers enter and exit the transportation network in which the global multi-vehicle decision making system operates.

Figure 4A:
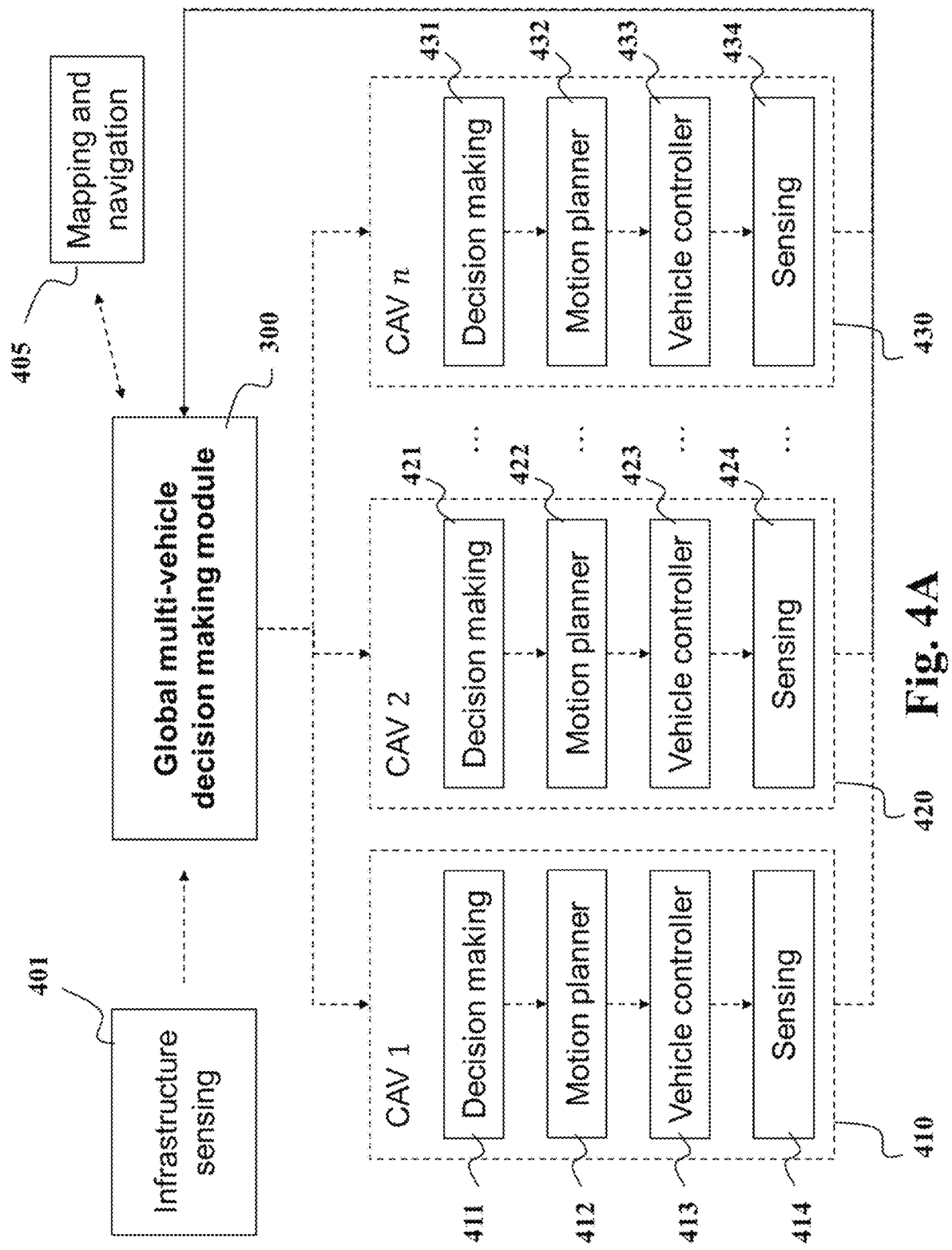
FIG. 4A shows a schematic diagram of a feedback loop for the global multi-vehicle decision making system, based on infrastructure sensing, centralized mapping and navigation and a multi-layer guidance and control architecture for each of the individual controlled vehicles, according to some embodiments of the invention.

FIG. 4A shows a schematic diagram of a feedback loop for the global multi-vehicle decision making system 300 that computes a motion plan that is provided to the multi-layer guidance and control architecture for each individual CAV 1, 2, ..., n, given real-time information from the infrastructure sensing 401, the centralized mapping and navigation module 405 and the on-board sensors 414, 424 and 434 of each individual CAV 410, 420 and 430. Based on a particular task assignment of the CAVs, e.g., for the transportation of people and goods in the traffic network, the centralized navigation module 405 can compute a route for each CAV from its current position to a desired destination or to a sequence of desired destinations. Based on the planned future route information for each CAV, and given additional real-time sensor information on the state of other traffic participants and of the environment in the transportation network, the global multi-vehicle decision making system 300 computes a coarse motion plan that can include a sequence of entering and exit times and of average velocity values for each CAV in each of the conflict zones and in each of the conflict-free road segments along the CAV's route from its current position to its desired destination or sequence of destinations, possibly including one or multiple planned intermediate stops along the route of the CAV, according to some embodiments of the invention.

Some embodiments of the invention are based on the realization that planning and control for (semi-)automated driving can be implemented effectively using a multi-layer guidance and control architecture, typically implemented on board of each vehicle, including one or multiple layers of algorithms and technologies for decision making, motion planning, vehicle control and/or estimation. For example, a decision making layer 411 for the CAV vehicle 410 selects the appropriate driving behavior at any point of time, given the motion plan from the global decision maker 300, the current environment condition, and given the behavior of the other traffic participants, e.g., using automata combined with set reachability or formal languages and optimization for vehicle decision making. Given the target behavior from the decision making layer 411, including either lane following, lane changing or stopping, a motion planning algorithm 412 aims to compute a dynamically feasible and safe motion trajectory that can be tracked in real-time by a relatively low-level (predictive) vehicle controller 413. Real-time sensor fusion and estimation using on-board and infrastructure sensing information can be performed in each vehicle, e.g., 414, in order to provide feedback to the higher-level algorithms for decision making, motion planning and control. A similar, but potentially different, multi-layer guidance and control architecture can be used for (semi-)automated driving in the other CAVs such as 421-424 in the $2^{nd}$ vehicle 420 or 431-434 in the $n^{th}$ vehicle 430.

A popular approach for (semi-)automated driving uses the combination of a finite-state machine (FSM) for decision making in 411, 421 and 431, a sampling-based motion planning algorithm in 412, 422 and 432, and a model predictive control (MPC) algorithm for reference trajectory tracking in 413, 423 and 433. One example of an algorithm for sampling-based motion planning uses probabilistic particle filtering to sample the input space and adds an additional correction term based on one or multiple driving requirements. One example of a predictive algorithm for vehicle control uses one or multiple iterations of a sequential quadratic programming (SQP) method to solve a linear time-varying or nonlinear MPC problem in real time. Some embodiments of the invention are based on the realization that the use of predictive algorithms for motion planning and reference tracking control for (semi-)automated driving can more effectively benefit from the predictive information in the motion plan that is computed by the global multi-vehicle decision making system 300. Examples of algorithms for sensor fusion and estimation are based on moving horizon estimation (MHE), extended or linear-regression Kalman filtering, or particle filtering.

In some embodiments of the invention, the different components of the multi-layer guidance and control architecture 411-414 can be implemented on board of each controlled vehicle 410, while other modules such as the global multi-vehicle decision making system 300, the mapping and navigation system 405, and some or all of the sensor fusion technologies for infrastructure sensing 401 may be implemented in the infrastructure, e.g., in the cloud and/or in one or multiple mobile edge computers (MECs), in order to provide decisions and/or feedback information to multiple connected vehicles in the transportation network.

In some embodiments of the invention, the infrastructure sensing 401 corresponds to one or multiple road-side units (RSUs) that include one or multiple sensors, e.g., distance range finders, radars, lidars, and/or cameras, as well as sensor fusion technologies in order to accurately detect the state of the vehicles and the dynamic environment in the transportation network, including both connected and non-connected vehicles, autonomous, semi-autonomous and manually operated vehicles and other traffic participants such as bicycles and pedestrians.

Some embodiments of the invention are based on the realization that safety constraints with respect to other dynamic traffic participants (i.e., not vehicles), e.g., including bicycles and pedestrians, could be handled by obstacle avoidance techniques in on-board modules of the multi-layer guidance and control architecture for each CAV, e.g., by the motion planning and/or the vehicle control algorithm. Due to their relatively smaller computational cost, compared to that for the global multi-vehicle decision making system in some embodiments of the invention, the motion planning and vehicle control algorithms can be run at a relatively fast sampling rate in order to have a fast reaction time to unexpected changes in the dynamic behavior of other vehicles and/or of the other traffic participants. For example, real-time vehicle control algorithms are typically executed with an update period of 50-100 milliseconds.

Some embodiments of the invention are based on the realization that a different vehicle motion model, with a different modeling accuracy and/or a different computational complexity, can be used by one or multiple of the components in the architecture as illustrated by FIG. 4A. For example, a one-dimensional kinematic model could be used to describe the motion of each vehicle in the global multi-vehicle decision making system 300 as follows $$d = v(t_{out} - t_{in} - t_{wait})$$

for a vehicle in a road segment, where $t_{in}$ and $t_{out}$ denote the time of entering and exiting the road segment, respectively, $t_{wait}$ denotes the waiting time corresponding to any intermediate planned stops in the road segment, v denotes the average velocity of the vehicle in the road segment and d is the distance travelled by the vehicle from time $t_{in}$ to time $t_{out}$ in the road segment.

Some embodiments of the invention are based on the realization that a vehicle motion model with a higher modeling accuracy, and possibly with a higher computational complexity, can be used by the components in the lower levels of the multi-layer guidance and control architecture as depicted in FIG. 4A. For example, the one-dimensional kinematic model can be used in the global multi-vehicle decision making system 300 and/or in the navigation module 405, while a higher-dimensional (nonlinear) kinematic model could be used to describe the motion of the vehicle in the decision maker 411, 421, 431, the motion planner 412, 422, 432, the vehicle controller 413, 423, 433, and/or the estimation algorithm 414, 424, 434 for each individual vehicle 410, 420 and 430. Alternatively, one or multiple of the lower levels of the multi-layer guidance and control architecture could use a higher-dimensional (nonlinear) dynamic model to describe the motion of the vehicle based on force-torque balances, e.g., in an (nonlinear) MPC-based vehicle controller 413, 423, 433.

For example, in some embodiments of the invention, a single-track nonlinear vehicle model can be used in an MPC-based vehicle controller 413, 423, 433 for which the state is described by the two-dimensional position, the longitudinal and lateral velocities, the yaw angle and yaw rate of the vehicle. The single-track vehicle model lumps together the left and right wheel on each axle. In some embodiments of the invention, a vehicle model with an even higher modeling accuracy and computational complexity can be used, e.g., based on a double-track vehicle model such that the longitudinal and lateral load transfer between the four wheels of the vehicle could be accurately modeled. In some embodiments of the invention, the nonlinear relation between the longitudinal and lateral tire-friction forces and the slip ratios and slip angles can be modeled using Pacejka's magic formula, which exhibits the typical saturation behavior in the tire forces. Under combined slip conditions, the coupling between longitudinal and lateral tire forces can be modeled, e.g., using a friction ellipse or using weighting functions.

Figure 4B:
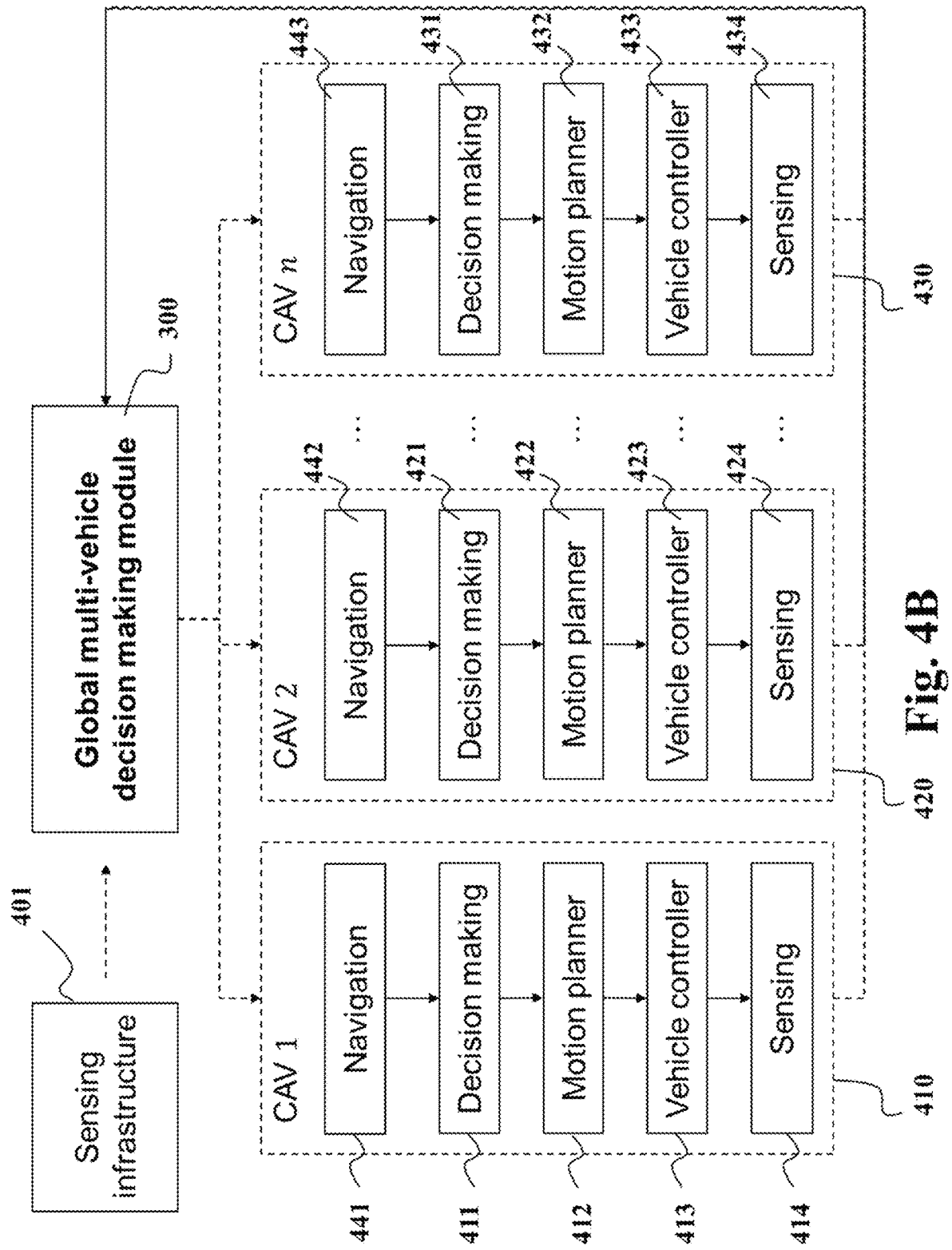
FIG. 4B shows a similar schematic diagram of a feedback loop for the global multi-vehicle decision making system, using an individual navigation system for one or multiple controlled vehicles, according to some embodiments of the invention.

FIG. 4B shows a similar schematic diagram of a feedback loop for the global multi-vehicle decision making system 300, without a centralized navigation module 405, but instead an individual navigation system 441, 442 and 443 can compute the route for each CAV 410, 420 and 430 from its current position to a desired destination or to a sequence of desired destinations. In some embodiments of the invention, each individual navigation system, e.g., 441, is executed on board of the corresponding controlled vehicle 410, and the future planned routing information from each of the individual navigation modules 441-443 can be communicated to the global multi-vehicle decision making system 300.

Figure 5A:
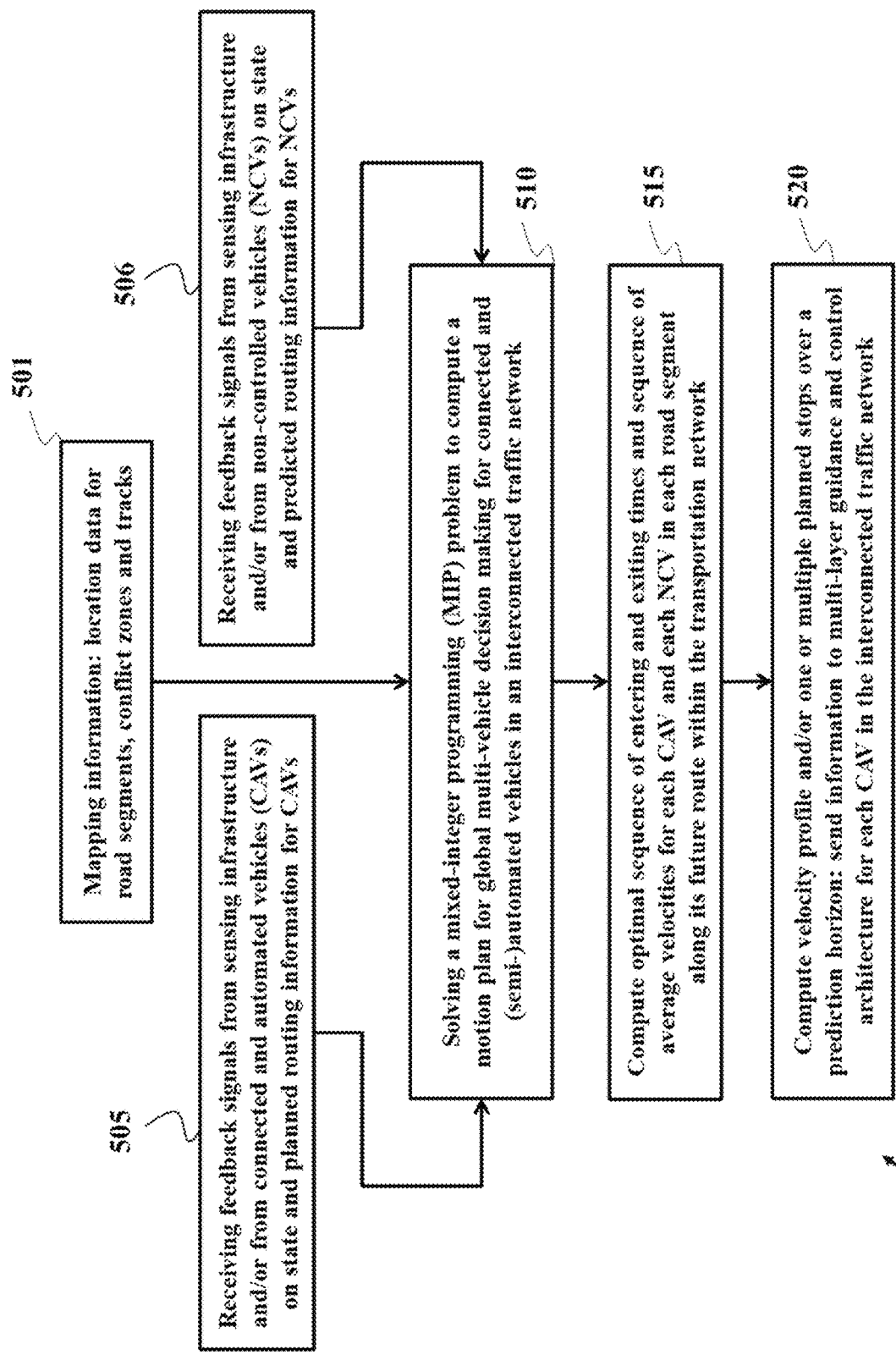
FIG. 5A shows a block diagram of a global multi-vehicle decision making system, based on communication with infrastructure and/or connected vehicles, by solving a mixed-integer optimization problem, according to embodiments of the invention.

FIG. 5A shows a block diagram of a global multi-vehicle decision making system 300, based on communication with infrastructure and/or connected vehicles (V2X), by solving a mixed-integer optimal control optimization problem 510 to compute a motion plan for global multi-vehicle decision making of connected and (semi-)automated vehicles in a transportation network. Inputs to the global multi-vehicle decision making system 300 can include mapping information 501, i.e., location data (e.g., GPS data) for conflict-free road segments, conflict zones and track lanes within each of the road segments. In addition, inputs to the global multi-vehicle decision making system 300 can include feedback signals on state and planned routing information for CAVs 505 as well as feedback signals on state and predicted routing information for NCVs 506. In some embodiments of the invention, the latter feedback signals are obtained directly or indirectly from the sensing infrastructure (e.g., RSUs) and/or from connected vehicles, which can be either autonomous, semi-autonomous and/or manually operated vehicles. The feedback signals on state and planned routing information for CAVs 505 can be referred to as type 1 feedback signals. The feedback signals on state and predicted routing information for NCVs 506 can be referred to as type 2 feedback signals.

In some embodiments of the invention, a solution to the mixed-integer optimal control optimization problem 510 can be used to compute an optimal sequence of entering and exiting times and an optimal sequence of average velocities for each CAV and each NCV in each road segment within the transportation network 515 along the future planned route for each CAV and the future predicted route for each NCV. Subsequently, in some embodiments of the invention, the optimal times and velocity sequences 515 can be used to compute a velocity profile and/or one or multiple planned stops over a prediction horizon 520 for each CAV. The latter information is sent to a multi-layer guidance and control architecture for each (semi-)automated CAV in the interconnected traffic network 520.

The transportation network can include one or multiple fully automated CAVs and/or one or multiple semi-automated CAVs. In some embodiments of the invention, the velocity profile for fully automated CAVs can be controlled by the global multi-vehicle decision making system 300 to control the entering and exiting time for the CAVs in each road segment, in order to improve the overall safety, time efficiency and energy efficiency of the traffic flow in the transportation network. The global multi-vehicle decision making system 300 can control if and when semi-automated CAVs are allowed to enter one or multiple conflict zones along their future planned route within the transportation network, but the velocity profile for semi-automated CAVs cannot be controlled directly by the global multi-vehicle decision making system 300, according to some embodiments of the invention. For example, at a particular time step, the global multi-vehicle decision making system 300 can instruct one or multiple semi-automated CAVs to stop at a traffic intersection (using a velocity profile that each semi-automated CAV can decide for itself), and with the additional information from the global multi-vehicle decision making system 300 on when to enter the traffic intersection safely, but the global multi-vehicle decision making system 300 cannot directly control the velocity profile for one or multiple semi-automated CAVs within the road segments of the transportation network.

Some embodiments of the invention use a long-term future route plan for each of the CAVs 505 in the global multi-vehicle decision making system as described in FIG. 5A. Some embodiments of the invention are based on the realization that, depending on the infrastructure system, obtaining a precise future prediction for the route of each NCV may prove challenging. Because of this, in some embodiments of the invention, the global multi-vehicle decision making system 300 is implemented in a receding horizon fashion based on the most recent information from the sensing infrastructure (e.g., RSUs) and/or from connected vehicles. Some embodiments of the invention are based on the realization that an approximate short-term future route prediction for NCVs 506 is sufficient and can typically be obtained relatively easily, e.g., from the current position of each NCV until the next conflict zone, and any discrepancies in the predictions can be adjusted by the intrinsic feedback mechanism of the receding horizon strategy. For example, an update period of 1-2 seconds allows for real-time computation of the global multi-vehicle decision making system 300, while providing sufficiently fast updates to the multi-layer guidance and control architecture for each CAV 520, to account for erroneous prediction of NCV behaviors.

Some embodiments of the invention are based on the realization that the global multi-vehicle decision making system 300 can be implemented by solving a constrained optimization problem 510 to compute the motion plan for each of the CAVs, given the input information from V2X communication. In some embodiments of the invention, the constrained optimization problem can be a mixed-integer programming (MIP) problem, for example, a mixed-integer linear programming (MILP) or mixed-integer quadratic programming (MIQP) problem. In some embodiments of the invention, the MIP problem at each sampling instant of the global multi-vehicle decision making system 300 can be solved 510 by a global optimization algorithm, for example, including branch-and-bound, branch-and-cut and branch-and-price methods. In other embodiments of the invention, heuristic techniques can be used to compute a feasible but suboptimal solution to the MIP, for example, including rounding schemes, a feasibility pumping method, approximate optimization algorithms, or the use of (deep) machine learning.

In some embodiments of the global multi-vehicle decision making system 300, the constrained optimization problem 510 includes the optimization (minimization) of one or multiple objectives and it enforces one or multiple equality and/or inequality constraints for safety and efficiency for all vehicles in the transportation network. For example, the constraints can include a vehicle motion model, velocity limit constraints, timing constraints for the future route plan or route prediction, safety constraints in conflict zones and occupancy constraints in conflict-free road segments. The objectives can include the minimization of the travel time to reach the end of each segment in the future route plan or route prediction, minimization of the waiting time for each vehicle, maximization of the average velocity and the minimization of accelerations for energy efficiency.

In some embodiments of the invention, the mixed-integer optimization (minimization) problem for global multi-vehicle decision making 510 can be solved using a branch-and-bound (B&B) optimization method that searches for a global optimal solution within a search space to produce an optimal control signal, where the B&B optimization iteratively partitions the search space into a nested tree of regions to find a solution with a globally optimal (minimal) objective value. The B&B method iteratively solves convex relaxations to compute lower bounds for the objective value within a region from the nested tree of regions. One or multiple regions can be pruned when the corresponding lower bounds are greater than the currently known upper bound to the globally optimal objective value. The upper bound to the globally optimal objective value can be updated when an integer feasible solution is found with an objective value that is smaller than the currently known upper bound to the globally optimal objective value.

Figure 5B:
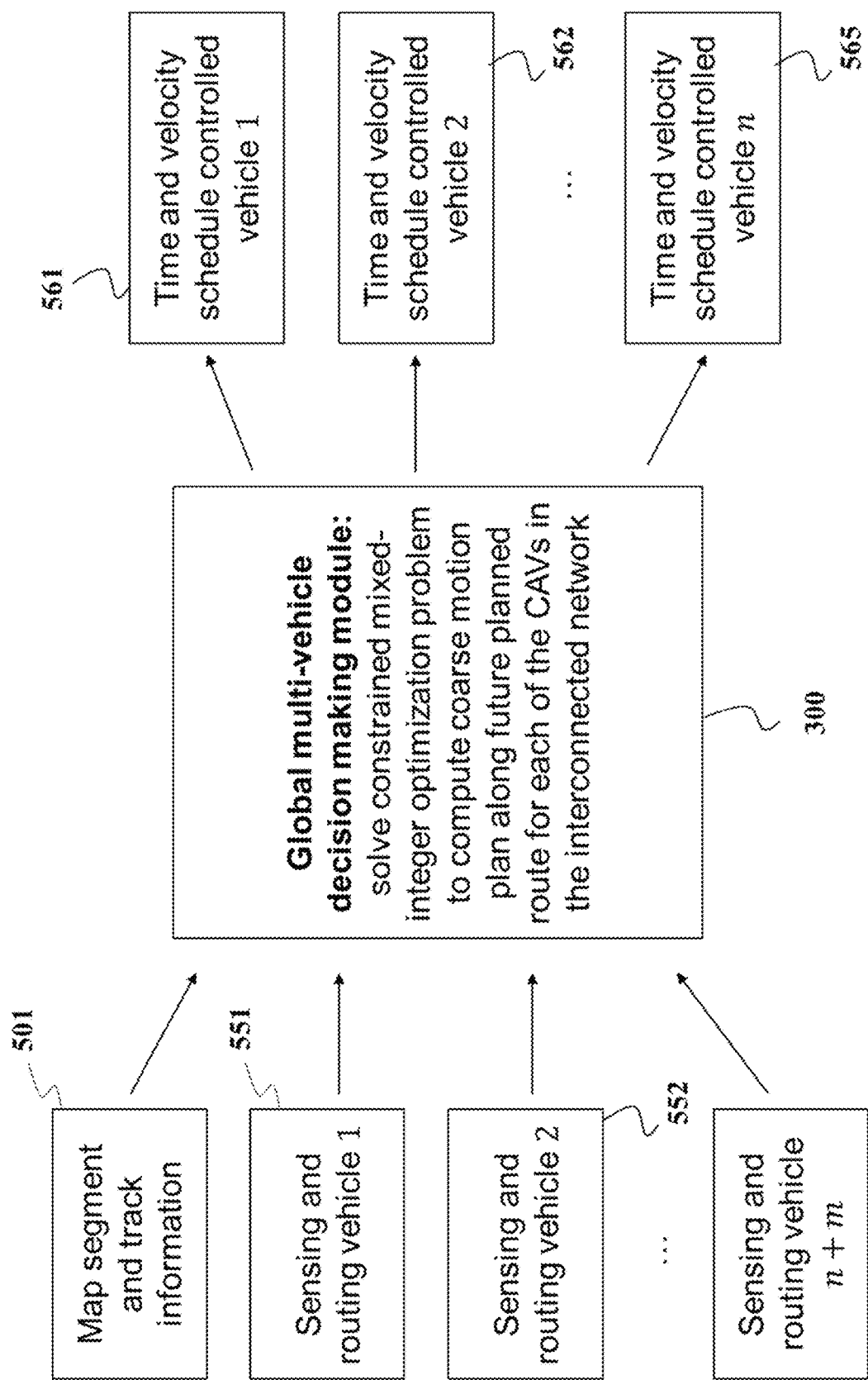
FIG. 5B shows a schematic diagram of the inputs to and the outputs from a global multi-vehicle decision making system, according to embodiments of the invention.

FIG. 5B shows a schematic diagram of the inputs to and the outputs from a global multi-vehicle decision making system 300, according to some embodiments of the invention. The inputs to the global multi-vehicle decision making system 300 can include mapping information 501, i.e., location data (e.g., GPS data) for conflict-free road segments, conflict zones and track lanes within each of the road segments, as well as sensing and routing information for one or multiple vehicles 551-555, some of which can be controlled vehicles and some of which can be non-controlled vehicles. For example, in a transportation network at a particular time instant, the inputs to the global multi-vehicle decision making system 300 may include sensing and future routing information for n CAVs and m NCVs, resulting in sensing and future routing information for n+m vehicles in total 551-555. According to some embodiments of the invention, the outputs from the global multi-vehicle decision making system 300 may include time and velocity schedules, i.e., a sequence of entering and exiting times and a sequence of average velocities for each CAV in each road segment within the transportation network along the future planned route for each CAV 561-565.

FIG. 6A illustrates an example of (a local area within) a transportation network consisting of multiple conflict-free road segments, interconnected via a 3-way intersection (i.e., conflict zone), and each of the road segments consists of one or multiple track lanes. For example, one road segment, referred to as $S_1$ 600 consists of multiple lanes 601-604, each of which is referred to as an individual track lane, e.g., $t_1$, $t_2$, $t_3$ and $t_4$ within road segment $S_1$ 600. In the example of FIG. 6A, each track lane is assumed to allow traffic flow only in a single direction as indicated by the arrow 605 (away from the intersection) for track lane $t_1$ 601 and as indicated by the arrow 606 (towards the intersection) for track lane $t_4$ 604 in road segment $S_1$ 600. Similarly, other road segments can be defined as part of the transportation network, e.g., such as road segment $S_3$ 610 that consists of track lanes 611-614 and road segment $S_4$ 620 that consists of track lanes 621-624. FIG. 6A illustrates a 3-way traffic intersection (i.e., conflict zone) that can be referred to as an additional road segment $S_2$ 630, according to embodiments of the invention, and it physically connects each of the conflict-free road segments 600, 610 and 620.

In some embodiments of the invention, each of the track lanes in a conflict zone corresponds to a potential path that a vehicle can follow within the conflict zone. For example, in FIG. 6A, track lane $t_1$ 631 within road segment $S_2$ 630 corresponds to the path (left turn) from track lane $t_4$ 624 in road segment $S_4$ 620 to track lane $t_1$ 601 in road segment $S_1$ 600. For example, track lane $t_2$ 632 in road segment $S_2$ 630 corresponds to the path (right turn) from track lane $t_4$ 624 in road segment $S_4$ 620 to track lane $t_4$ 614 within road segment $S_3$ 610. For example, track lane $t_5$ 635 within road segment $S_2$ 630 corresponds to the path (drive straight) from track lane $t_1$ 611 in road segment $S_3$ 610 to track lane $t_1$ 601 in road segment $S_1$ 600. For example, track lane $t_{12}$ 639 within road segment $S_2$ 630 corresponds to the path (right turn) from track lane $t_4$ 604 in road segment $S_1$ 600 to track lane $t_1$ 621 in road segment $S_4$ 620. Each of the track lanes in road segment $S_2$ 630, e.g., track lanes $t_1, t_2, t_3, \ldots, t_{11}, t_{12}$ (and possibly even more track lanes) can be defined similarly based on a path that connects one track lane within one neighboring road segment with one track lane within another neighboring road segment.

Embodiments of the invention are based on the realization that a global multi-vehicle decision making system needs to know, for each vehicle and for each road segment along its route from the current position to the desired destination of the vehicle, on which track lane (and in which road segment) the vehicle is currently driving and on which track lanes the vehicle plans to drive in the future (in each of the road segments along its route). For example, according to some embodiments of the invention, two vehicles cannot overtake each other, and therefore they cannot switch their respective order, while driving on the same track lane within any road segment without one of the two vehicles potentially switching to a different track lane within the road segment. In addition, according to some embodiments of the invention, two vehicles within a conflict zone (e.g., an intersection as depicted in FIG. 6A), may or may not be at risk of colliding, depending on which track lanes each of the vehicles are following within the conflict zone. For example, two vehicles are not at risk of colliding when one of the vehicles is driving on track lane $t_9$ and the other vehicle is driving on track lane $t_{11}$ within the conflict zone $S_2$ 630, since both track lanes are parallel to each other and they therefore do not physically intersect. However, two vehicles are potentially at risk of colliding when one of the vehicles is driving on track lane $t_9$ and the other vehicle is driving on track lane $t_3$ within the conflict zone $S_2$ 630, since both track lanes physically intersect with each other.

Figure 6B:
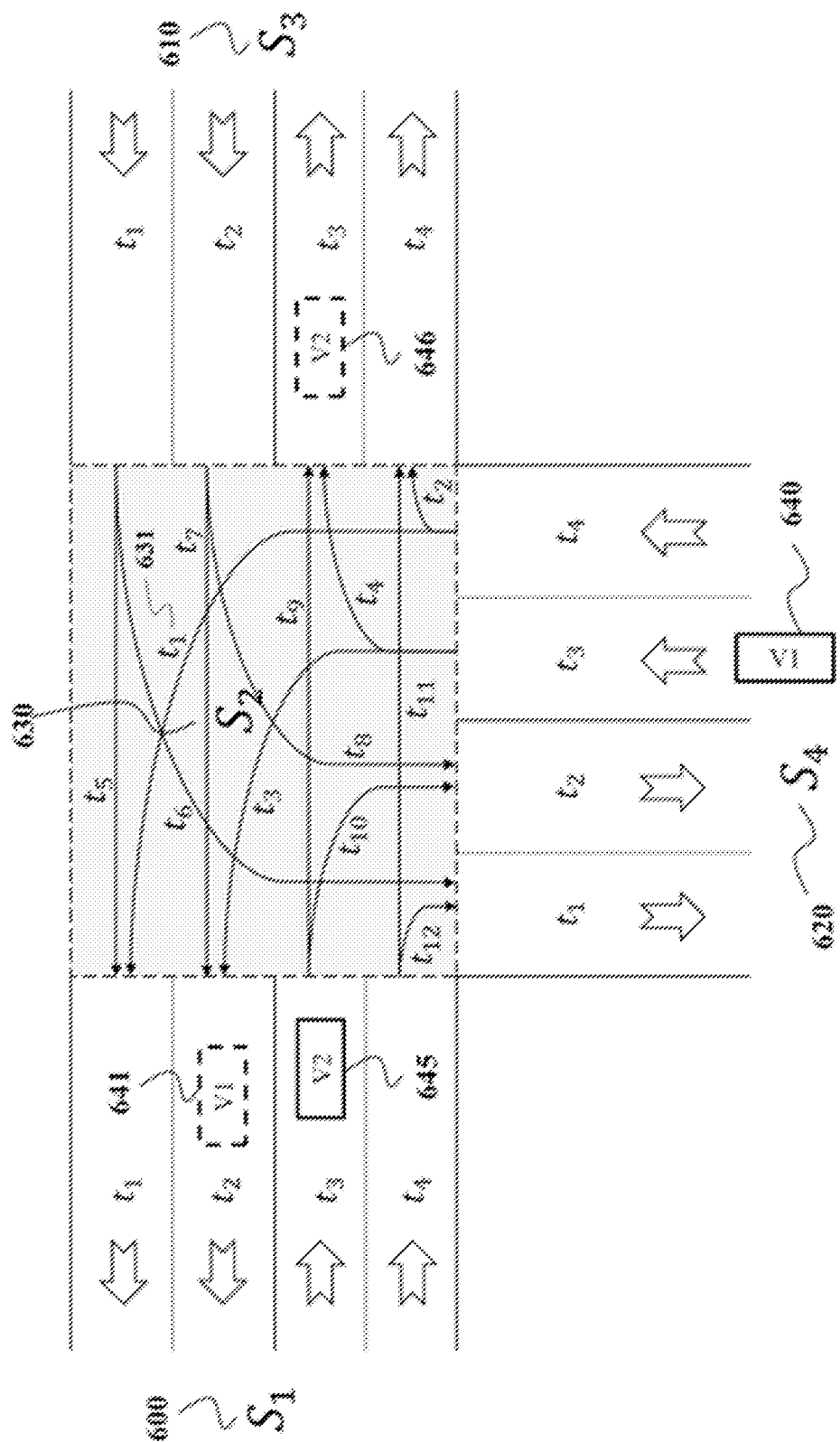
FIG. 6B shows an example of a possible route for each of two vehicles within the interconnected transportation network as illustrated in FIG. 6A.

FIG. 6B shows the same example of (a local area within) a transportation network, as depicted in FIG. 6A, but it additionally illustrates a possible route that a vehicle V1 640 and a second vehicle V2 645 might plan to follow in the transportation network. For example, the first vehicle V1 640 is currently driving on track lane $t_3$ in road segment $S_4$ 620 and could plan to drive along track lane $t_3$ (left turn at intersection) in conflict zone $S_2$ 630 in order to, after crossing the conflict zone, continue driving on track lane $t_2$ in road segment $S_1$ 600, as illustrated by the future vehicle position 641. Similarly, the second vehicle V2 645 is currently driving on track lane $t_3$ in road segment $S_1$ 600 and could plan to drive along track lane $t_9$ (drive straight through intersection) in conflict zone $S_2$ 630 in order to, after crossing the conflict zone, continue driving on track lane $t_3$ in road segment $S_3$ 610, as illustrated by the future vehicle position 646.

According to some embodiments of the invention, if both vehicle V1 640 and vehicle V2 645 are connected and automated vehicles (CAVs), a global multi-vehicle decision making system can compute a motion plan for each of the CAVs and decide whether vehicle V1 640 should cross the conflict zone $S_2$ 630 along track lane $t_3$ before vehicle V2 645 can cross the conflict zone $S_2$ 630 along track lane $t_9$, or whether vehicle V1 640 should cross the conflict zone $S_2$ 630 along track lane $t_3$ after vehicle V2 645 finishes crossing the conflict zone $S_2$ 630 along track lane $t_9$, in order to avoid any possible collisions between these two vehicles because track lanes $t_3$ and $t_9$ physically intersect with each other in the conflict zone $S_2$ 630. Alternatively, if one or multiple of the vehicles are non-controlled vehicles (NCVs), according to some embodiments of the invention, a global multi-vehicle decision making system can compute a motion plan for each of the CAVs while predicting the motion plan for each of the NCVs, e.g., assuming that each of the NCVs aims to follow each of the traffic rules that apply within the transportation network. In some cases, the motion plan may be coarse motion plan along future planned route for each of the CAVs. Embodiments of the invention are based on the realization that an approximate short-term prediction for NCVs is sufficient, e.g., until the next conflict zone, and any discrepancies in the predictions can be adjusted by the intrinsic feedback mechanism of a receding horizon implementation of the global multi-vehicle decision making system.

Figure 6C:
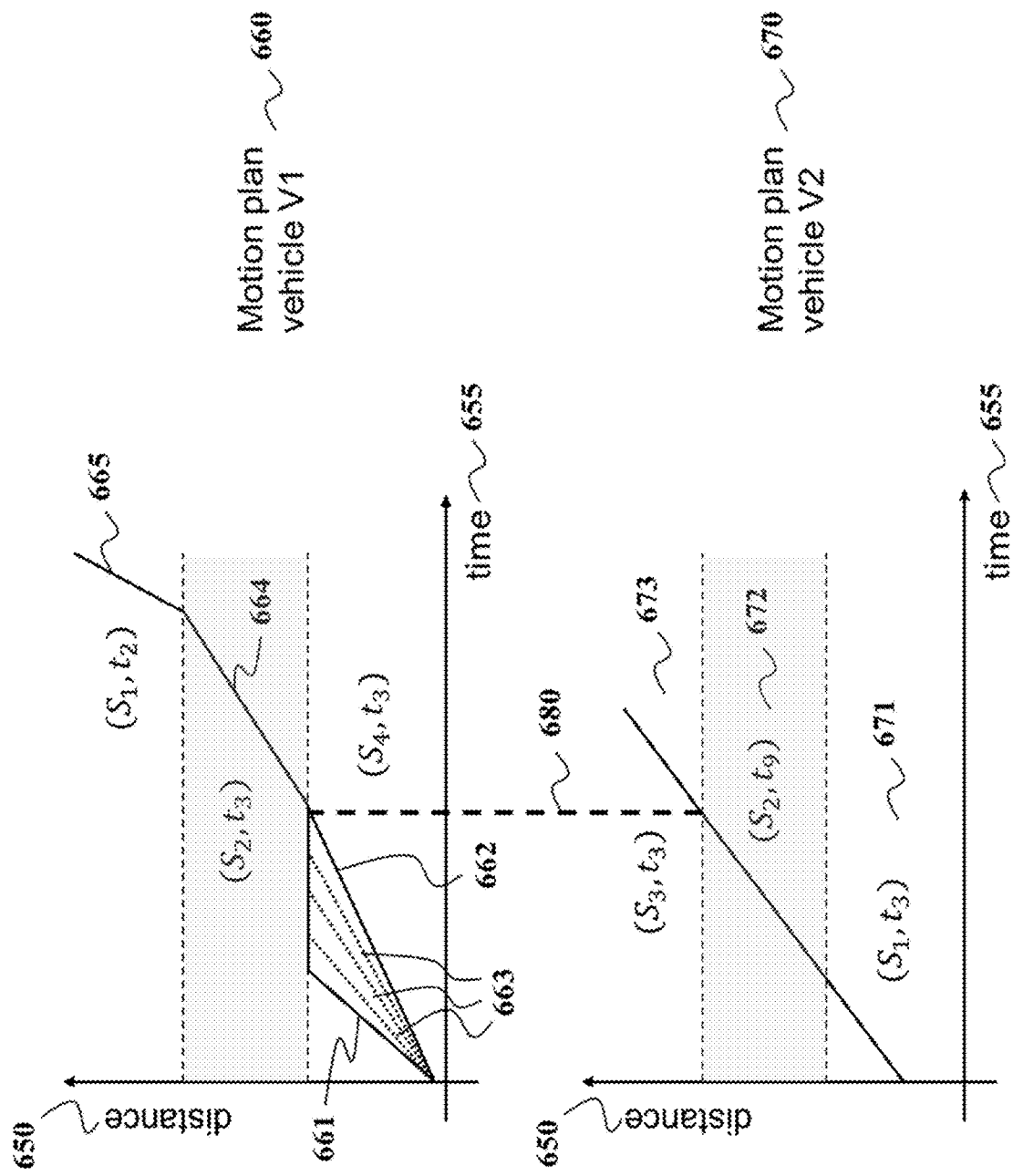
FIG. 6C illustrates examples of motion plans that can be computed by a global multi-vehicle decision making system for the vehicles as illustrated within the transportation network in FIG. 6B, according to embodiments of the invention.

FIG. 6C shows examples of motion plans that can be computed by a global multi-vehicle decision making system for a vehicle V1 660 and for another vehicle V2 670, illustrated within the transportation network in FIG. 6B, according to some embodiments of the invention. FIG. 6C illustrates the motion plan for vehicle V1 660 and for vehicle V2 670 by showing a plot of the traveled distance 650 with respect to time 655 for each trajectory. As illustrated by 680 for the example in FIG. 6C, vehicle V1 640 starts crossing the conflict zone $S_2$ 664 along track lane $t_3$ only after vehicle V2 645 finishes crossing the conflict zone $S_2$ 672 along track lane $t_9$, in order to avoid any possible collisions between these two vehicles because track lanes $t_3$ and $t_9$ physically intersect with each other in the conflict zone $S_2$ 630. FIG. 6C shows that the motion plan for vehicle V1 can consist of one or multiple parts in the trajectory, corresponding to each of the road segments and track lanes along the future planned route for that vehicle, e.g., a trajectory 661 on track lane $t_3$ in road segment $S_4$, followed by a trajectory 664 on track lane $t_3$ in conflict zone $S_2$ and followed by a trajectory 665 on track lane $t_2$ in road segment $S_1$. Similarly, the motion plan for vehicle V2 can consist, e.g., of a trajectory 671 on track lane $t_3$ in road segment $S_1$, a trajectory 672 on track lane $t_9$ in conflict zone $S_2$ and a trajectory 673 on track lane $t_3$ in road segment $S_3$.

Some embodiments of the invention are based on the realization that often multiple trajectories exist, with different average velocity values for each of the trajectories, for any vehicle within a road segment in order to arrive at the end of the road segment before a particular time instant. For example, as illustrated by the trajectories 663 in FIG. 6C, multiple trajectories exist with different average velocity values for vehicle V1 640 on track lane $t_3$ in road segment $S_4$ in order to arrive at the end of the road segment $S_4$ before the time instant 680 at which the vehicle V1 can safely enter the conflict zone $S_2$ because, at that time instant, vehicle V2 645 finishes crossing the conflict zone $S_2$ along track lane $t_9$ 672. Each of the individual trajectories 663 could be computed by a global multi-vehicle decision making system as part of a motion plan for vehicle V1 (on track lane $t_3$ in road segment $S_4$), according to some embodiments of the invention, in order to optimize one or a combination of multiple objectives, e.g., travel time, waiting time and/or energy efficiency. More specifically, it can be observed from FIG. 6C that a trajectory 661 could be computed with a relatively large average velocity and therefore a small travel time but a relatively large waiting time for vehicle V1 before entering the conflict zone $S_2$. Alternatively, a trajectory 662 could be computed with a relatively small average velocity and therefore a relatively large travel time but a small waiting time or even no waiting time at all for vehicle V1 before entering the conflict zone $S_2$ in its motion plan.

Some embodiments of the invention are based on the realization that a tradeoff exists between a minimization of the overall travel time (e.g., for each vehicle in each road segment along its route) and a minimization of the overall waiting time (e.g., for each vehicle at the end of one road segment and before entering the subsequent road segment along its route) for the CAVs in the transportation network. Specifically, according to some embodiments of the invention, a global multi-vehicle decision making system could instruct the CAVs to drive as fast as possible in each road segment along its route, while respecting all of the safety constraints and speed limits, which would lead to relatively small travel times but may lead additionally to relatively large waiting times. Alternatively, according to some embodiments of the invention, the global multi-vehicle decision making system could instruct one or multiple CAVs to drive slower (either immediately or in the future) when it is predicted that a CAV is required to wait at the end of a road segment before safely entering the subsequent road segment along its route, in order to reduce the overall waiting time. Some embodiments of the invention are based on the realization that alternative or additional objectives can be used by the global multi-vehicle decision making system to compute a motion plan for each of the CAVs in the transportation network such as, e.g., a minimization of the overall amount of accelerations and/or decelerations for each vehicle along its route in order to optimize the overall energy efficiency.

Figure 7:
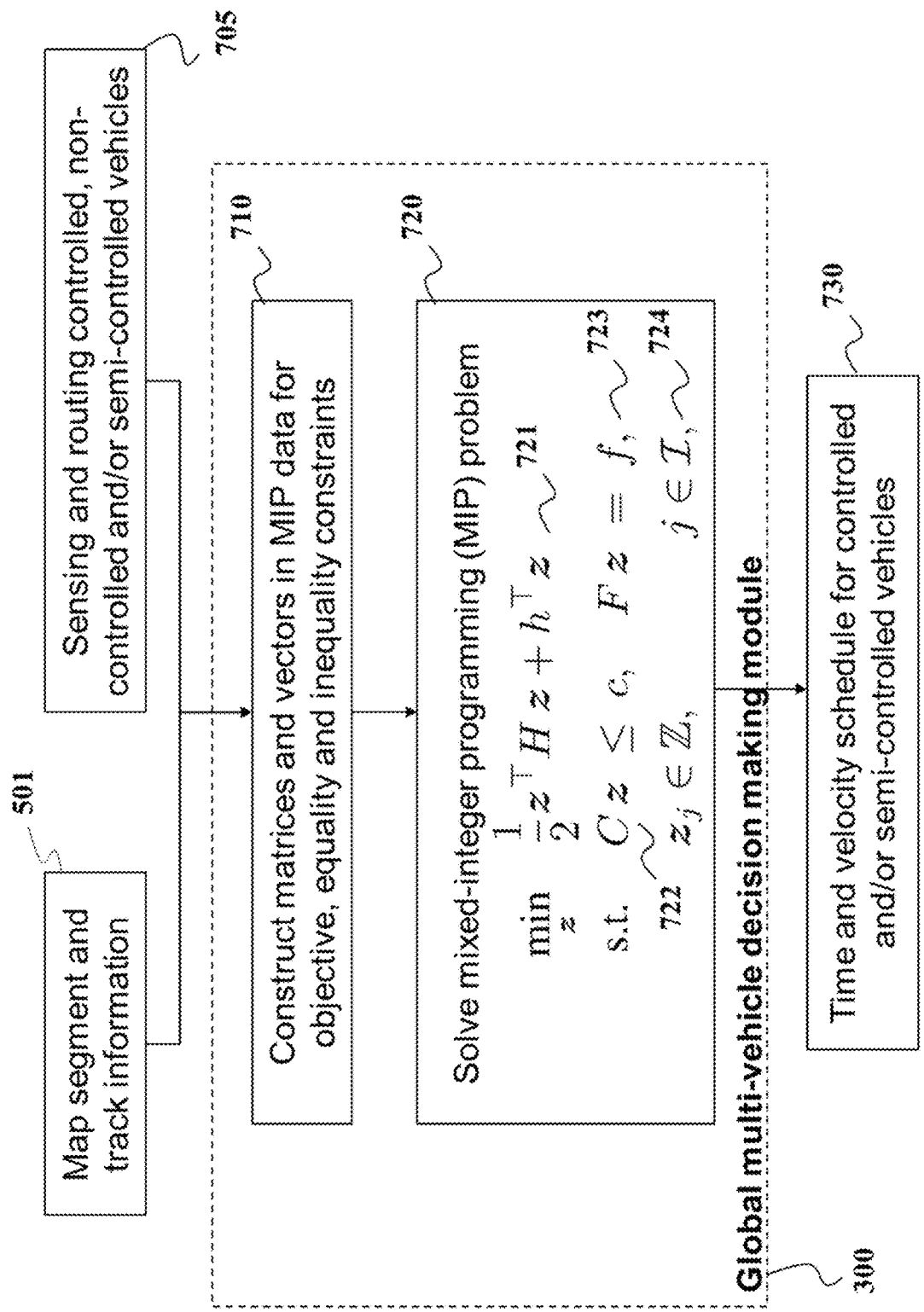
FIG. 7 shows a block diagram of a global multi-vehicle decision making system, by solving a mixed-integer programming (MIP) optimization problem, according to embodiments of the invention.

FIG. 7 shows a block diagram of a global multi-vehicle decision making system 300, based on communication with infrastructure and/or connected vehicles (V2X), by solving a mixed-integer programming (MIP) problem 720 to compute a motion plan, e.g., consisting of a time and velocity schedule for each of the controlled and/or semi-controlled vehicles 730 in a transportation network. Inputs to the global multi-vehicle decision making system 300 can include mapping information 501, i.e., location data (e.g., GPS data) for conflict-free road segments, conflict zones and track lanes within each of the road segments. In addition, inputs to the global multi-vehicle decision making system 300 can include feedback signals on sensing and (planned or predicted) routing information for each of the controlled, non-controlled and/or semi-controlled vehicles 705 in the transportation network. According to some embodiments of the invention, and as illustrated in FIG. 7, the inputs to the global multi-vehicle decision making system 300 can be used to construct matrices and vectors in MIP data to define the objective, equality and inequality constraints 710, in order to construct and solve the resulting mixed-integer programming (MIP) problem 720.

In some embodiments of the invention, the MIP problem can be a mixed-integer linear programming (MILP) or mixed-integer quadratic programming (MIQP) problem. For example, the MIP that is illustrated in FIG. 7 is an MIQP that consists of a linear-quadratic objective function 721, defined by a positive semi-definite Hessian matrix H≥0 and a gradient vector h. The MIP can additionally include one or multiple linear inequality constraints 722, defined by the constraint matrix C and constraint vector c, and one or multiple linear equality constraints 723, defined by the constraint matrix F and constraint vector f. Finally, the MIQP 720 for the global multi-vehicle decision making system 300 can include one or multiple integrality constraints 724, which restrict one or multiple optimization variables $z_j$ to lie in the set of integer values, i.e., $z_j \in \mathbb{Z}$. In some embodiments of the invention, the objective function 721 is a linear function, i.e., H=0, such that the resulting MIP 720 is an MILP optimization problem.

Figure 8A:
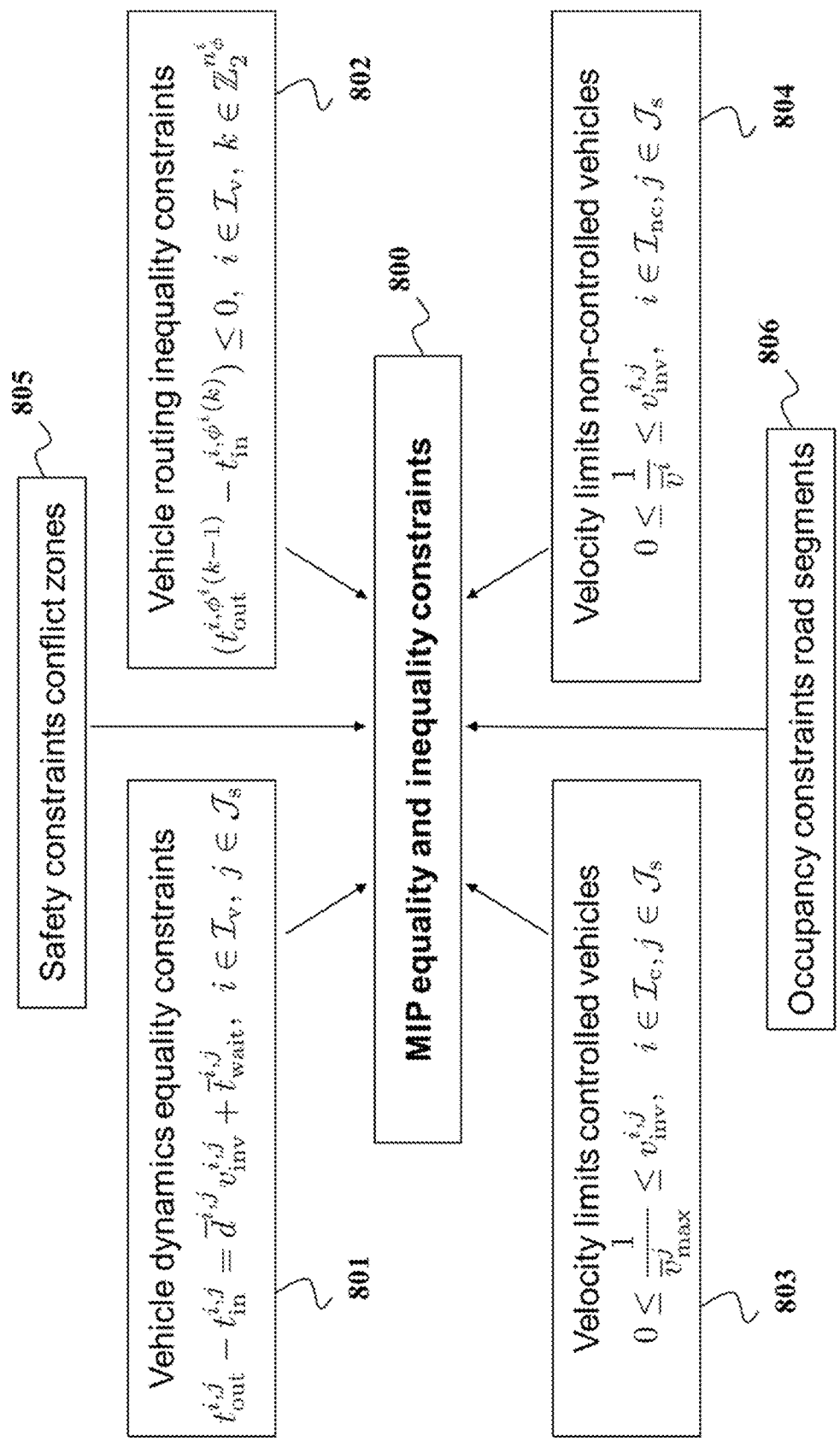
FIG. 8A illustrates examples of equality and/or inequality constraints that can be enforced by the MIP problem that is solved by the global multi-vehicle decision making system, according to embodiments of the invention.

FIG. 8A illustrates examples of equality and/or inequality constraints 800 that can be enforced by the MIP problem 720 that is solved by the global multi-vehicle decision making system 300. In some embodiments of the invention, the MIP problem 720 can include vehicle dynamics equality constraints 801, vehicle routing inequality constraints 802, velocity limit constraints for controlled and/or semi-controlled vehicles (CAVs) 803, velocity limit constraints for non-controlled vehicles (NCVs) 804, safety constraints for each of the conflict zones 805 and occupancy constraints for each of the (conflict and/or conflict-free) road segments 806 in the transportation network.

In some embodiments of the invention, the global multi-vehicle decision making system is based on the solution of an MIP 720 that includes inverse velocities in the optimization variables, e.g., such that a one-dimensional kinematic motion model for each of the CAVs and NCVs can be defined by the following linear vehicle dynamics equality constraints 801

$$t_{out}^{i,j} - t_{in}^{i,j} = \bar{d}^{i,j} v_{inv}^{i,j} + \bar{t}_{wait}^{i,j}, i \in \mathcal{I}_v, j \in \mathcal{J}_s$$

where the variables $t_{in}^{i,j}$ and $t_{out}^{i,j}$ denote the entering and exiting times, respectively, and the variables $v_{inv}^{i,j}$, denote the inverse velocity for each of the vehicles $i \in I_v$ in road segment $j \in J_s$ of the transportation network. In addition, the values $\bar{d}^{i,j}$ and $\bar{t}_{wait}^{i,j}$ are fixed quantities that are computed by and/or provided to the global multi-vehicle decision making system and they denote the (planned or predicted) distance to be traveled and the (planned or predicted) waiting time, respectively, for each vehicle $i \in I_v$ in each road segment $j \in J_s$ of the transportation network.

In some embodiments of the invention, at each time step of the receding horizon implementation for the global multi-vehicle decision making system, the distance to be traveled $\bar{d}^{i,j}$ can be computed as the distance from the current position of the vehicle $i \in I_v$ to the end of the road segment $j \in J_s$, along the track lane, if the vehicle is currently inside of the road segment. If the vehicle $i \in I_v$ is currently outside of the road segment $j \in J_s$, then the distance to be traveled $\bar{d}^{i,j}$ can be computed as the total distance to be traveled along the (planned or predicted) track lane for vehicle $i \in I_v$ in road segment $j \in J_s$. More specifically, in some embodiments of the invention, the quantities $\bar{d}^{i,j}$ can be defined as follows $$\bar{d}^{i,j} = \begin{cases} 0 & \text{if } j \notin \phi^i \\ \bar{d}^j - \mathcal{D}^j(p^i) & \text{if } j \in \phi^i \end{cases}$$

where $\bar{d}^{i,j}=0$ if the vehicle $i \in I_v$ is not planned or predicted to travel in road segment $j \in J_s$ of the transportation network. Otherwise, the distance to be traveled $\bar{d}^{i,j}$ can be computed as the total distance to be traveled along the (planned or predicted) track lane for vehicle $i \in I_v$ in road segment $j \in J_s$, minus the already traveled distance $D^j(p^i)$ for the current position $p^i$ of vehicle $i \in I_v$ in road segment $j \in J_s$, i.e., $\bar{d}^{i,j} = \bar{d}^j - D^j(p^i)$ in the vehicle dynamics equality constraints 801 of the MIP problem 720.

In some embodiments of the invention, at each time step of the receding horizon implementation for the global multi-vehicle decision making system, the waiting time $\bar{t}_{wait}^{i,j}$ can be computed as the total waiting time that is planned or predicted for each vehicle $i \in I_v$ in road segment $j \in J_s$ of the transportation network. More specifically, the total waiting time $\bar{t}_{wait}^{i,j}=0$ if the vehicle $i \in I_v$ is currently not planned or predicted to be waiting inside of road segment $j \in J_s$ along its route in the transportation network. Alternatively, if a vehicle is planned or predicted to perform an intermediate stop, e.g., for pick-up and/or drop-off of passengers in road segment $j \in J_s$ along its route in the transportation network, then the waiting time $\bar{t}_{wait}^{i,j}$ corresponds to a prediction or estimate of the total time needed to perform this intermediate stop along its route, in order to define the vehicle dynamics equality constraints 801 of the MIP problem 720.

Some embodiments of the invention are based on the realization that one or multiple of these quantities, such as the values $\bar{d}^{i,j}$ and $\bar{t}_{wait}^{i,j}$, can change from one time step to the next time step at which the global multi-vehicle decision making system is executed in a receding horizon implementation. Any discrepancies in the predictions for the behavior of the vehicles can be adjusted by the intrinsic feedback mechanism of the receding horizon strategy.

In some embodiments of the invention, the global multi-vehicle decision making system is based on the solution of an MIP 720 that includes vehicle routing inequality constraints 802 to enforce the order between exiting and entering subsequent road segments $\phi^i(k-1)$ and $\phi^i(k)$ in the planned or predicted future route $\phi^i = [\phi^i(1), \phi^i(2), \ldots, \phi^i(n_\phi^i)]$ for each vehicle $i \in I_v$. For example, some embodiments of the invention use the following formulation of the vehicle routing inequality constraints 802

$$(t_{out}^{i,\phi^i(k-1)} - t_{in}^{i,\phi^i(k)}) \leq 0, i \in \mathcal{I}_V, k \in \mathbb{Z}_2^{n_\phi^i}$$

which enforces that vehicle $i \in I_v$ can only enter road segment $\phi^i(k)$, after exiting road segment $\phi^i(k-1)$ along its route within the transportation network.

In some embodiments of the invention, the global multi-vehicle decision making system is based on the solution of an MIP 720 that includes one or multiple velocity limit constraints 803 for the controlled or semi-controlled vehicles (CAVs). Some embodiments of the invention restrict the velocity of each CAV to remain a positive value, excluding, e.g., parking maneuvers where the velocity may alternate between positive and negative values, and the velocity can be restricted to remain below a maximum allowed value for the speed limit that can be different for each road segment within the transportation network. For example, in terms of the inverse velocity variables, the velocity limit constraints 803 for CAVs can be formulated in the MIP 720 as follows $$0 \leq \frac{1}{\bar{v}_{max}^j} \leq v_{inv}^{i,j}, i \in \mathcal{I}_c, j \in \mathcal{J}_s$$

In some embodiments of the invention, the global multi-vehicle decision making system is based on the solution of an MIP 720 that includes one or multiple velocity limit constraints 804 for the non-controlled vehicles (NCVs). Some embodiments of the invention are based on the realization that the velocity of NCVs cannot be controlled directly, such that the global multi-vehicle decision making system does not have the freedom to choose any sequence of velocity values for each NCV along its predicted route. Instead, some embodiments of the invention aim to restrict the predicted velocities for each NCV to remain relatively close to its current velocity value that is provided by the state estimation and sensing modules (e.g., by RSUs in the sensing infrastructure).

In some embodiments of the invention, the inverse velocity variables for the NCVs correspond to a prediction of the inverse for the average velocity for each of the NCVs in each road segment along its predicted route, e.g., based on the current velocity and/or acceleration values of the NCVs. For example, some embodiments of the invention include following velocity limit constraints 804 for NCVs $$0 \leq \frac{1}{\bar{v}^i} \leq v_{inv}^{i,j}, i \in \mathcal{I}_{nc}, j \in \mathcal{J}_s$$

where $\bar{v}^i$ can be the current velocity value, which is measured or estimated, for the NCV $i \in I_{nc}$. In some embodiments of the invention, the velocity value $\bar{v}^i$ in the velocity limit constraints 804 for NCVs can be computed by a predictor module, e.g., based on (deep) machine learning techniques, which aims to predict the most likely driving behavior of each NCV based on recently collected past (real-time) data of driving behavior of each NCV in the transportation network.

FIG. 8B shows an example of a formulation of safety constraints for each of the conflict zones 805 in the MIP problem 720 that is solved by the global multi-vehicle decision making system 300. In some embodiments of the invention, for each road segment $j \in J_s$ that is a conflict zone, i.e., $j \in C$ in the transportation network, safety constraints 810 restrict that two vehicles $i, k \in I_v$ can never be inside of the conflict zone $j \in C$ at the same time if vehicle i and vehicle k are planned or predicted to drive on conflicting track lanes within the conflict zone $j \in C$ in the transportation network. More specifically, if vehicle i and vehicle k are planned or predicted to drive on conflicting track lanes within the conflict zone $j \in C$, then vehicle i exits the conflict zone before vehicle k enters or vehicle k exits the conflict zone before vehicle i enters 811

$$(t_{out}^{i,j} \leq t_{in}^{k,j} - \epsilon) \vee (t_{out}^{k,j} \leq t_{in}^{i,j} - \epsilon)_c$$

where $\epsilon \geq 0$ is a small positive fixed value that defines a tolerance on the timing constraints. In some embodiments of the invention, two vehicles $i, k \in I_v$ may be allowed to be inside of a conflict zone $j \in C$ at the same time if vehicle i and vehicle k are planned or predicted to drive on non-conflicting track lanes within the conflict zone $j \in C$ in the transportation network. For example, two vehicles may be allowed to be inside of a conflict zone at the same time if they drive, e.g., on the same track lane within the conflict zone or if they drive on two track lanes that do not physically intersect with each other.

Some embodiments of the invention are based on the realization that the MIP problem 720 can include safety constraints for conflict zones 810 using a big-M formulation 820 and using one binary decision variable $b^{i,j,k} \in \{0,1\}$, i.e., the value of the decision variable $b^{i,j,k}$ is restricted to be either 0 or 1, for each pair of two vehicles $i, k \in I_v$ in each conflict zone $j \in C$ in the transportation network $$\forall i \in \mathcal{I}_c, j \in \mathcal{C}, k \in \{\ell \in \mathcal{I}_c, \ell \leq i-1\} \cup \mathcal{I}_{nc}:$$

$$(t_{out}^{i,j} - t_{in}^{k,j} - M\, b^{i,j,k}) \leq -\epsilon,$$

$$(t_{out}^{k,j} - t_{in}^{i,j} + M\, b^{i,j,k}) \leq M - \epsilon,$$

where $M > 0$ is a positive fixed value that is chosen to be sufficiently large and $\epsilon \geq 0$ is a positive fixed value that defines a tolerance on the timing constraints and which is typically chosen to be relatively small. Some embodiments of the invention are based on the realization that the safety constraints for conflict zones 805 are typically symmetric and, therefore, these constraints need to be enforced only for each unique pair of two vehicles in the MIP problem 720. In some embodiments of the invention, alternative formulations of the safety constraints for each of the conflict zones 805 can be used in the MIP problem 720, e.g., using a convex hull formulation to result in more tight convex relaxations at the cost of a potentially higher dimensional optimization problem.

FIG. 8C shows an example of a formulation of occupancy constraints for each of the road segments 806 in the MIP problem 720 that is solved by the global multi-vehicle decision making system 300. In some embodiments of the invention, for each road segment $j \in J_s$ in the transportation network, occupancy constraints 830 restrict that two vehicles i, $k \in I_v$ cannot swap their respective order at any time while they are planned or predicted to drive on the same track lane within the road segment $j \in J_s$ in the transportation network. More specifically, if vehicle i and vehicle k are planned or predicted to drive on the same track lane within a road segment $j \in J_s$, then vehicle i enters and exits the road segment j before vehicle k enters and exits the road segment j or vehicle i enters and exits the road segment j after vehicle k enters and exits the road segment j 830. In some embodiments of the invention, if two vehicles i, $k \in I_v$ are planned or predicted to drive on the same track lane within the road segment $j \in J_s$ followed by the same subsequent road segment $l \in J_s$ in each of their planned or predicted routes, then vehicle i enters and exits the road segments j and l before vehicle k enters and exits the road segments j and l or vehicle i enters and exits the road segments j and l after vehicle k enters and exits the road segments j and l 831.

$$(t_{in}^{i,j} \le t_{in}^{k,j} - \epsilon \wedge t_{out}^{i,j} \le t_{out}^{k,j} - \epsilon \wedge t_{in}^{i,l} \le t_{in}^{k,l} - \epsilon) \vee (t_{in}^{k,j} \le t_{in}^{i,j} - \epsilon \wedge t_{out}^{k,j} \le t_{out}^{i,j} - \epsilon \wedge t_{in}^{k,l} \le t_{in}^{i,l} - \epsilon)$$

where $\epsilon \ge 0$ is a small positive fixed value that defines a tolerance on the timing constraints. In some embodiments of the invention, the occupancy constraints 830 are enforced only for particular track lanes in road segments that do not allow any overtaking between two vehicles, e.g., by performing double lane changes.

Some embodiments of the invention are based on the realization that the MIP problem 720 can include occupancy constraints for road segments 830 using a big-M formulation 840 and using one binary decision variable $b^{i,j,k} \in \{0,1\}$, i.e., the value of the decision variable $b^{i,j,k}$ is restricted to be either 0 or 1, for each pair of two vehicles i, $k \in I_v$ in each road segment $j \in J_s$ and/or in each conflict-free road segment $j \in F$ in the transportation network $$\forall i \in \mathcal{I}_c, j \in \mathcal{F}, k \in \{\ell \in \mathcal{I}_c, \ell \le i-1\} \cup \mathcal{I}_{nc}:$$

$$(t_{in}^{i,j} - t_{in}^{k,j} - M b^{i,j,k}) \le -\epsilon,$$

$$(t_{in}^{k,j} - t_{in}^{i,j} + M b^{i,j,k}) \le M-\epsilon,$$

$$(t_{out}^{i,j} - t_{out}^{k,j} - M b^{i,j,k}) \le -\epsilon,$$

$$(t_{out}^{k,j} - t_{out}^{i,j} + M b^{i,j,k}) \le M-\epsilon,$$

$$\forall i \in \mathcal{I}_c, j \in \mathcal{F}, k \in \{\ell \in \mathcal{I}_c, \ell \le i-1\} \cup \mathcal{I}_{nc},$$

$$l = \psi^i(j) = \psi^k(j):$$

$$(t_{in}^{i,l} - t_{in}^{k,l} - M b^{i,j,k}) \le -\epsilon,$$

$$(t_{in}^{k,l} - t_{in}^{i,l} + M b^{i,j,k}) \le M-\epsilon,$$

where M>0 is a positive fixed value that is chosen to be sufficiently large and $\epsilon \ge 0$ is a positive fixed value that defines a tolerance on the timing constraints and which is typically chosen to be relatively small. Some embodiments of the invention are based on the realization that the occupancy constraints for road segments 806 are typically symmetric and, therefore, these constraints need to be enforced only for each unique pair of two vehicles in the MIP problem 720. In some embodiments of the invention, alternative formulations of the occupancy constraints for each of the road segments 806 can be used in the MIP problem 720, e.g., using a convex hull formulation to result in more tight convex relaxations at the cost of a potentially higher dimensional optimization problem.

Figure 8D:
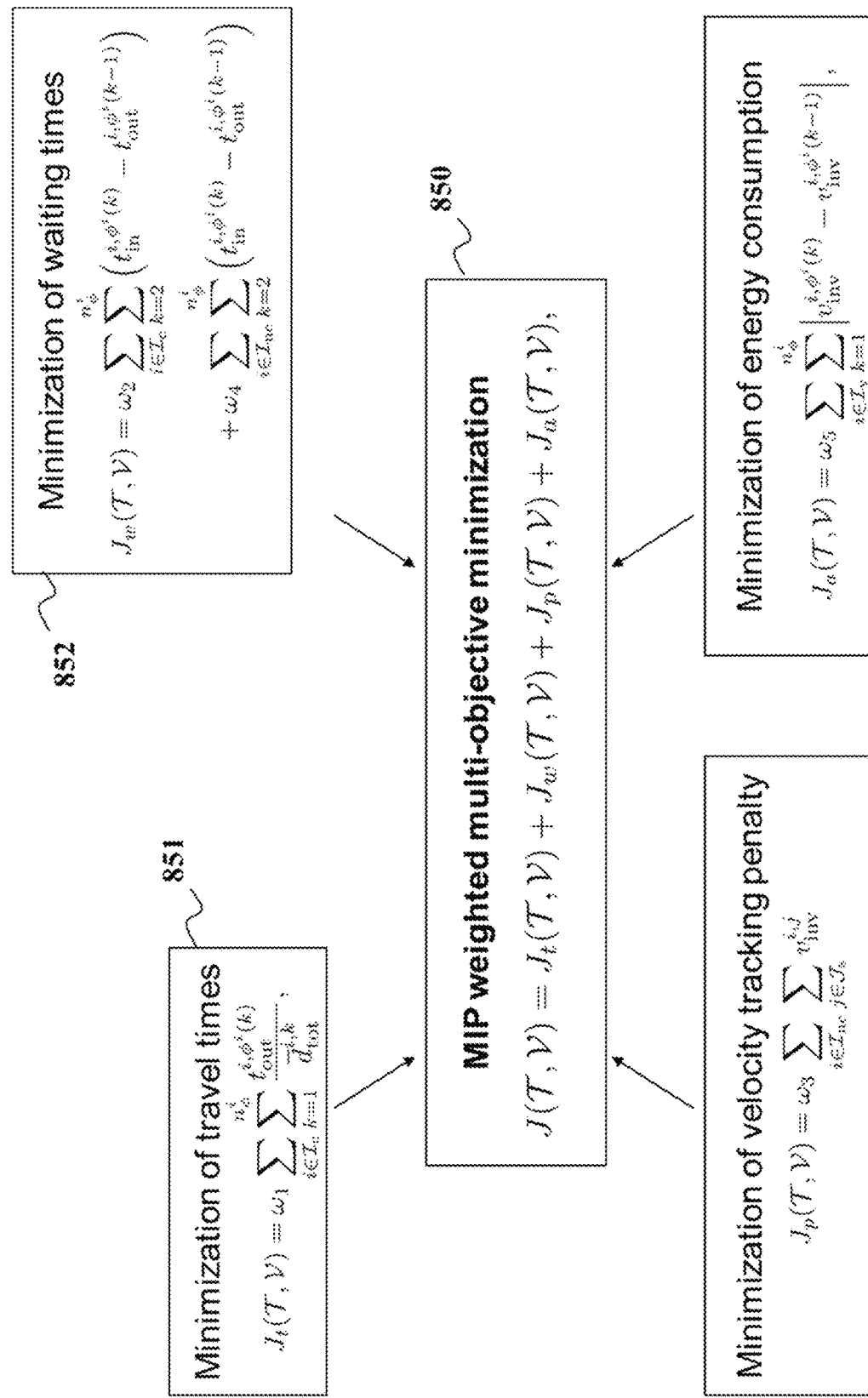
FIG. 8D illustrates examples of objectives that can be used in a weighted multi-objective minimization for the MIP problem that is solved by the global multi-vehicle decision making system, according to embodiments of the invention.

FIG. 8D illustrates examples of objectives that can be included in a weighted multi-objective minimization 850 in the MIP problem 720 that is solved by the global multi-vehicle decision making system 300, according to embodiments of the invention. For example, the weighted multi-objective minimization function 850 in the MIP problem 720 may read as follows $$J(\mathcal{T}, \mathcal{V}) = J_t(\mathcal{T}, \mathcal{V}) + J_w(\mathcal{T}, \mathcal{V}) + J_p(\mathcal{T}, \mathcal{V}) + J_a(\mathcal{T}, \mathcal{V})$$

where $J_t$ can correspond to a minimization of travel times 851, $J_w$ can correspond to a minimization of waiting times 852, $J_p$ can correspond to a minimization of velocity tracking penalties 853 and $J_a$ can correspond to a minimization of acceleration and/or deceleration values, i.e., a minimization of energy consumption 854 for each of the vehicles in the transportation network.

In some embodiments of the invention, the minimization of travel times 851 in the MIP problem 720 is performed as the minimization of a summation of entering and/or exiting times for each of the vehicles in the transportation network. In some embodiments of the invention, the minimization of travel times 851 in the MIP problem 720 is performed as the minimization of a weighted sum of the times for each of the vehicles to reach its desired destination in the transportation network. For example, in some embodiments of the invention, the minimization of travel times 851 in the MIP problem 720 reads as follows $$J_t(\mathcal{T}, \mathcal{V}) = \omega_1 \sum_{i \in I_c} \sum_{k=1}^{n_\phi^i} \frac{t_{out}^{i,\phi^i(k)}}{\overline{d}_{tot}^{i,k}},$$

where $\overline{d}_{tot}^{i,k} = \sum_{j=1}^{k} \overline{d}^{i,\phi^i(j)}$ is defined as the total distance traveled by vehicle $i \in I_v$ until the end of the $k^{th}$ road segment in its planned or predicted route within the transportation network. The latter objective function $J_t$ 851 aims at minimizing the travel time for each vehicle to reach the end of each road segment along its planned or predicted route, with corresponding weight value $\omega_1 \ge 0$ and normalized by the total distance traveled $\overline{d}_{tot}^{i,k}$ for each vehicle i and road segment k.

Some embodiments of the invention are based on the realization that a waiting time is defined for each vehicle $i \in I_v$, and for each pair of subsequent road segments $\phi^i(k-1)$ and $\phi^i(k)$ in the planned or predicted route for that vehicle $\phi^i = [\phi^i(1), \phi^i(2), \ldots, \phi^i(n_\phi^i)]$ within the transportation network, as the difference between the entering time $t_{in}^{i,\phi^i(k)}$ and the exiting time $t_{out}^{i,\phi^i(k-1)}$. The latter difference value corresponds to a time period that vehicle $i \in I_v$ is expected to wait, i.e., with velocity 0, before crossing from a road segment $\phi^i(k-1)$ into the subsequent road segment $\phi^i(k)$ along the planned or predicted route of the vehicle. In some embodiments of the invention, the weighted multi-objective minimization 850 in the MIP problem 720 includes a minimization of the sum of waiting times 852 for each of the vehicles and for each pair of subsequent road segments in their planned or predicted future route in the transportation network $$J_w(\mathcal{T}, \mathcal{V}) = \omega_2 \sum_{i \in I_c} \sum_{k=2}^{n_\phi^i} \left( t_{in}^{i,\phi^i(k)} - t_{out}^{i,\phi^i(k-1)} \right) + \omega_4 \sum_{i \in I_{nc}} \sum_{k=2}^{n_\phi^i} \left( t_{in}^{i,\phi^i(k)} - t_{out}^{i,\phi^i(k-1)} \right)$$

with corresponding weight values $\omega_2 \geq 0$ and $\omega_4 \geq 0$ for the minimization of waiting times 852 for CAVs and for NCVs, respectively. In some embodiments of the invention, the weight value $\omega_4$ is chosen to be considerably larger than $\omega_2$, i.e., $\omega_4 \gg \omega_2$, because the global multi-vehicle decision making system cannot directly control if and when and for how long NCVs will wait between two subsequent road segments along their predicted future route.

In some embodiments of the invention, the weighted multi-objective minimization 850 in the MIP problem 720 includes a minimization of velocity tracking penalties 853, e.g., for the non-controlled vehicles (NCVs), in order to restrict the velocities for each of the NCVs to remain relatively close to a predicted value for the average velocity of the NCV in each road segment along its future route within the transportation network. For example, in some embodiments of the invention, the MIP objective 850 includes a minimization of the sum of inverse velocity variables for each of the NCVs in each of the road segments in the transportation network $$J_p(\mathcal{T}, \mathcal{V}) = \omega_3 \sum_{i \in I_{nc}} \sum_{j \in J_s} v_{inv}^{i,j}$$

with corresponding weight value $\omega_3 \geq 0$, and this minimization of the sum of inverse velocity variables corresponds to a maximization of the velocities for each of the NCVs in order to restrict the velocities for each of the NCVs to remain relatively close to a maximum value that is enforced by the (inverse) velocity limit constraints 804, using a predicted value for the average velocity of the NCV in each road segment along its future route within the transportation network.

In some embodiments of the invention, the weighted multi-objective minimization 850 in the MIP problem 720, which is solved by the global multi-vehicle decision making system, includes a minimization of energy consumption 854 for each of the vehicles in the transportation network in order to improve the overall energy efficiency of the interconnected traffic flow. For example, in some embodiments of the invention, the MIP objective 850 includes a minimization of the accelerations and/or decelerations of each vehicle in the transportation network, which are closely related to the energy consumption. The latter objective function can be implemented directly if the motion model for each vehicle's system dynamics includes acceleration and/or deceleration variables. Alternatively, in some embodiments of the invention, the minimization of energy consumption 854 is approximated by the minimization of a sum of absolute changes in average (inverse) velocity of each vehicle and for each pair of subsequent road segments, e.g., $\phi^i(k-1)$ and $\phi^i(k)$ for vehicle $i \in I_v$, as follows $$J_a(\mathcal{T}, \mathcal{V}) = \omega_5 \sum_{i \in I_v} \sum_{k=1}^{n_\phi^i} \left| v_{inv}^{i,\phi^i(k)} - v_{inv}^{i,\phi^i(k-1)} \right|,$$

with corresponding weight value $\omega_5 \geq 0$, and where $$v_{inv}^{i,\phi^i(0)} = \frac{1}{\overline{v}^i}$$

can be defined, i.e., it denotes the inverse of a current or predicted average velocity value for each vehicle $i \in I_v$. Some embodiments of the invention are based on the realization that the 1-norm in the minimization of energy consumption 854 could be reformulated using additional optimization variables and additional inequality constraints in the MIP problem 720. Alternatively, in some embodiments of the invention, the minimization of energy consumption 854 is approximated by the minimization of a sum of squared changes in average (inverse) velocity of each vehicle and for each pair of subsequent road segments along its future planned or predicted route within the transportation network.

In some embodiments of the invention, using a global multi-vehicle decision making system for a transportation network consisting of $n_s$ interconnected road segments and supporting up to $n_c$ controlled vehicles (CAVs) and up to $n_{nc}$ non-controlled vehicles (NCVs), the MIP problem 720 that needs to be solved at each time step of the global multi-vehicle decision making system can include the following optimization variables, equality and inequality constraints number of continuous optimization variables: $3n_s(n_c + n_{nc})$, e.g., including entering and exiting time variables and (inverse) velocity variables for each vehicle $i \in I_v$ and each road segment $j \in J_s$ in the transportation network;

number of binary optimization variables:

$$n_s n_c \left( n_{nc} + \frac{n_c - 1}{2} \right),$$

including one binary variable for each unique pair of vehicles on each road segment, e.g., in order to enforce safety constraints for conflict zones 805 and/or to enforce occupancy constraints for road segments 806;

number of equality constraints: $n_s(n_c + n_{nc})$, e.g., including vehicle dynamics equality constraints 801 for each vehicle in each road segment;

number of inequality constraints (excluding simple bounds on variables):

$$\sum_{k=1}^{n_c + n_{nc}} \left( n_\phi^i - 1 \right) + n_c(2|C| + 6|F|) \left( n_{nc} + \frac{n_c - 1}{2} \right), \text{ e.g.,}$$

including vehicle routing inequality constraints 802, safety constraints for conflict zones 805 and/or occupancy constraints for road segments 806;

where |C| and |F| denote the total number of conflict zones and of conflict-free road segments, respectively. Some embodiments of the invention are based on the realization that, for practical applications of global multi-vehicle decision making, it can be desirable that the MIP problem 720 has fixed dimensions, e.g., supporting a (relatively large)

upper bound of road segments, conflict zones, controlled and non-controlled vehicles in the transportation network.

Some embodiments of the invention are based on the realization that redundant optimization variables can be removed automatically by a pre-solve routine in the numerical optimization algorithm that is used to solve the MIP problem 720 in the global multi-vehicle decision making system 300. In some embodiments of the invention, one or multiple redundant optimization variables can be fixed explicitly to a particular value by adjusting the corresponding simple bounds for each redundant optimization variable in the MIP problem 720.

For example, in some embodiments of the invention, redundant optimization variables can be fixed and removed according to simple rules, e.g., $$\phi^i(1) = j \Rightarrow t_{in}^{i,j} = 0,$$

$$\overline{d}^{i,j} = 0 \Rightarrow t_{in}^{i,j} = t_{out}^{i,j} = 0,$$

$$j \notin \phi^i \vee \phi^k \notin \phi^k \Rightarrow b^{i,j,k} = 0,$$

$$j = \phi^i(1) = \phi^k(1) \wedge \overline{d}^{i,j} \leq \overline{d}^{k,j} \Rightarrow b^{i,j,k} = 0,$$

$$j = \phi^i(1) = \phi^k(1) \wedge \overline{d}^{k,j} \leq \overline{d}^{i,j} \Rightarrow b^{i,j,k} = 1.$$

The first equation corresponds to a vehicle $i \in I_v$ that is currently already present inside a road segment $j \in J_s$, such that the corresponding entering time can be fixed to be equal to zero, i.e., $t_{in}^{i,j} = 0$. Similarly, both entering and exiting time variables can be fixed to be equal to zero, i.e., $t_{in}^{i,j} = t_{out}^{i,j} = 0$, for any vehicle $i \in I_v$ that is not planned or predicted to enter a road segment $j \in J_s$ (second equation, based on distance to be traveled $\overline{d}^{i,j} = 0$). The third equation corresponds to fixing a binary variable $b^{i,j,k} = 0$, which can be used to remove the binary variable and to remove the corresponding inequality constraints from the MIP problem 720, if either a vehicle i or a vehicle k is not planned or predicted to enter a road segment $j \in J_s$, i.e., if either $j \notin \phi^i$ or $j \notin \phi^k$ is true. As a final example, based on the fourth and fifth equations above, a binary variable can be fixed to either 0 or 1, i.e., $b^{i,j,k} = 0$ or $b^{i,j,k} = 1$, if both a vehicle i and a vehicle k are currently already present inside a road segment $j \in J_s$, and the fixed value of the binary optimization variable depends on the order of the vehicles within the road segment.

Some embodiments of the invention are based on the realization that, after fixing one or multiple binary optimization variables, one or multiple of the corresponding inequality constraints can become redundant and they can be removed by setting the corresponding lower bound values to $-\infty$ and/or by setting the corresponding upper bound values to $\infty$. Some embodiments of the invention are based on the realization that one or multiple of the vehicle dynamics equality constraints 801 can be used to remove one or multiple of the continuous optimization variables, e.g., the vehicle dynamics equality constraints 801 could be used to remove the (inverse) velocity variables from the MIP problem 720.

Figure 9A:
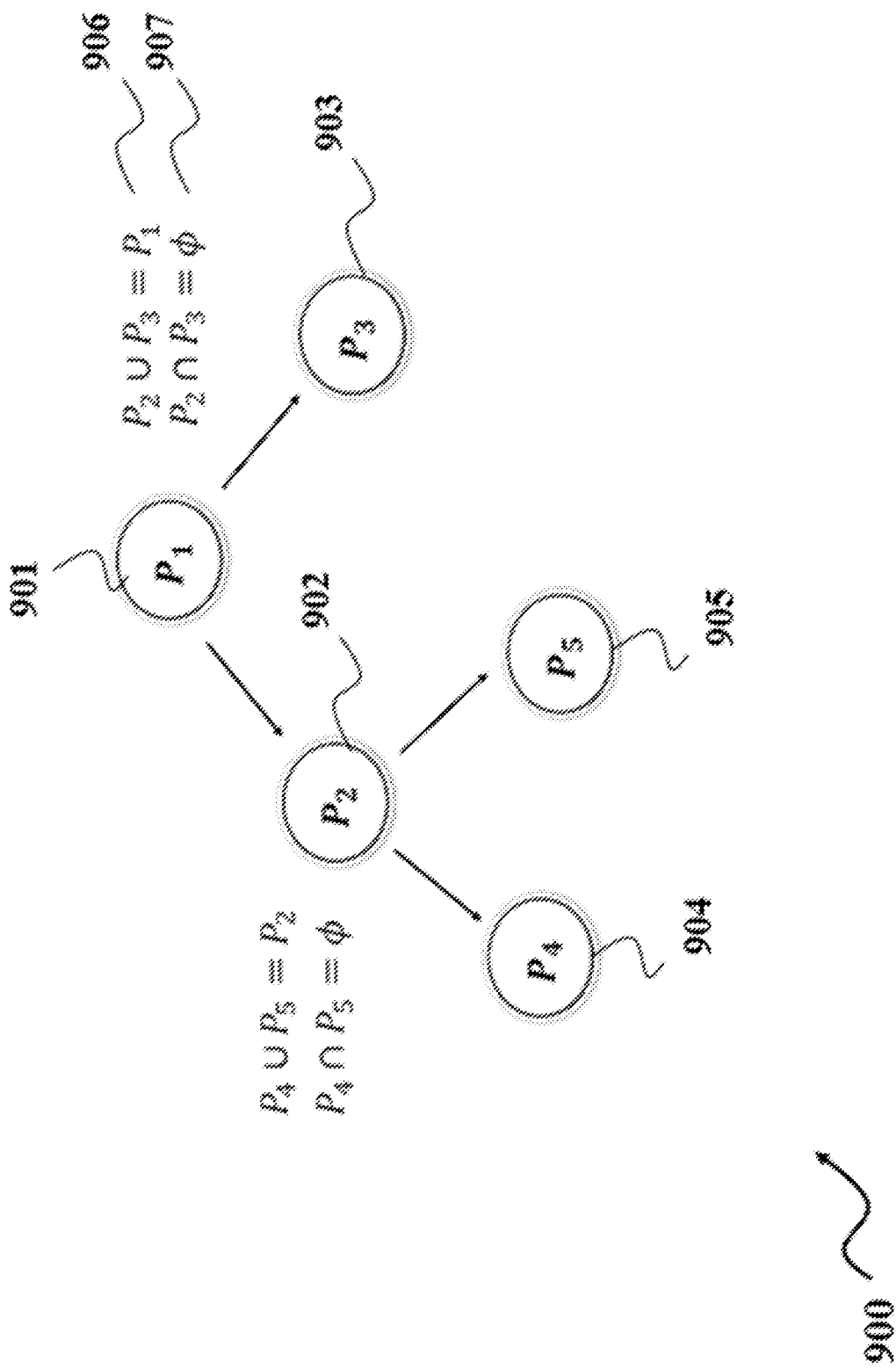
FIG. 9A illustrates a schematic of an example of an integer optimization variable search tree that represents a nested tree of search regions for the integer-feasible optimal solution for global multi-vehicle decision making, according to some embodiments of the invention.

FIG. 9A illustrates a schematic of an example of a binary decision variable search tree that represents a nested tree of search regions for the integer-feasible solution of the MIP problem 720 in the global multi-vehicle decision making system 300, according to some embodiments. FIG. 9A shows a schematic representation of a branch-and-bound method, which can be used to implement the global multi-vehicle decision making system in some embodiments, by showing the binary search tree 900 at a particular iteration of the mixed-integer optimization algorithm. The main idea of a branch-and-bound (B&B) method is to sequentially create partitions of the original MIP problem 720 and then attempt to solve those partitions, where each partition corresponds to a particular region of the discrete optimization variable search space. In some embodiments of the invention, a branch-and-bound method selects a partition or node and selects a discrete optimization variable to branch this partition into smaller partitions or search regions, resulting in a nested tree of partitions or search regions.

For example, the partition $P_1$ 901 represents a discrete search region that can be split or branched into two smaller partitions or regions $P_2$ 902 and $P_3$ 903, i.e., a first and a second region that are nested in a common region. The first and the second region are disjoint, i.e., the intersection of these regions is empty $P_2 \cap P_3 = \phi$ 907, but they form the original partition or region $P_1$ together, i.e., the union $P_2 \cup P_3 = P_1$ 906 holds after branching. The branch-and-bound method then solves an integer-relaxed optimization problem for both the first and the second partition or region of the search space, resulting in two solutions (local optimal solutions) that can be compared against each other as well as against the currently known upper bound value to the optimal objective value. The first and/or the second partition or region can be pruned if their performance metric is less optimal than the currently known upper bound to the optimal objective value of the MIP problem. The upper bound value can be updated if the first region, the second region or both regions result in a discrete feasible solution to the MIP problem. The branch-and-bound method then continues by selecting a remaining region in the current nested tree of regions for further partitioning.

While solving each partition may still be challenging, it is fairly efficient to obtain local lower bounds on the optimal objective value, by solving local relaxations of the mixed-integer program (MIP) or by using duality. If the MIP solver happens to obtain an integer-feasible solution while solving a local relaxation, the MIP solver can then use it to obtain a global upper bound for the mixed-integer solution of the original MIP problem in the global multi-vehicle decision making system. This may help to avoid solving or branching certain partitions that were already created, i.e., these partitions or nodes can be pruned. This general algorithmic idea of partitioning can be represented as a binary search tree 900, including a root node, e.g., $P_1$ 901 at the top of the tree, and leaf nodes, e.g., $P_4$ 904 and $P_5$ 905 at the bottom of the tree. In addition, the nodes $P_2$ 902 and $P_3$ 903 are typically referred to as the direct children of node $P_1$ 901, while node $P_1$ 901 is referred to as the parent of nodes $P_2$ 902 and $P_3$ 903. Similarly, nodes $P_4$ 904 and $P_5$ 905 are children of their parent node $P_2$ 902. In some embodiments of the invention, the MIP problem can be a mixed-integer linear programming (MILP) or mixed-integer quadratic programming (MIQP) problem.

Figure 9B:
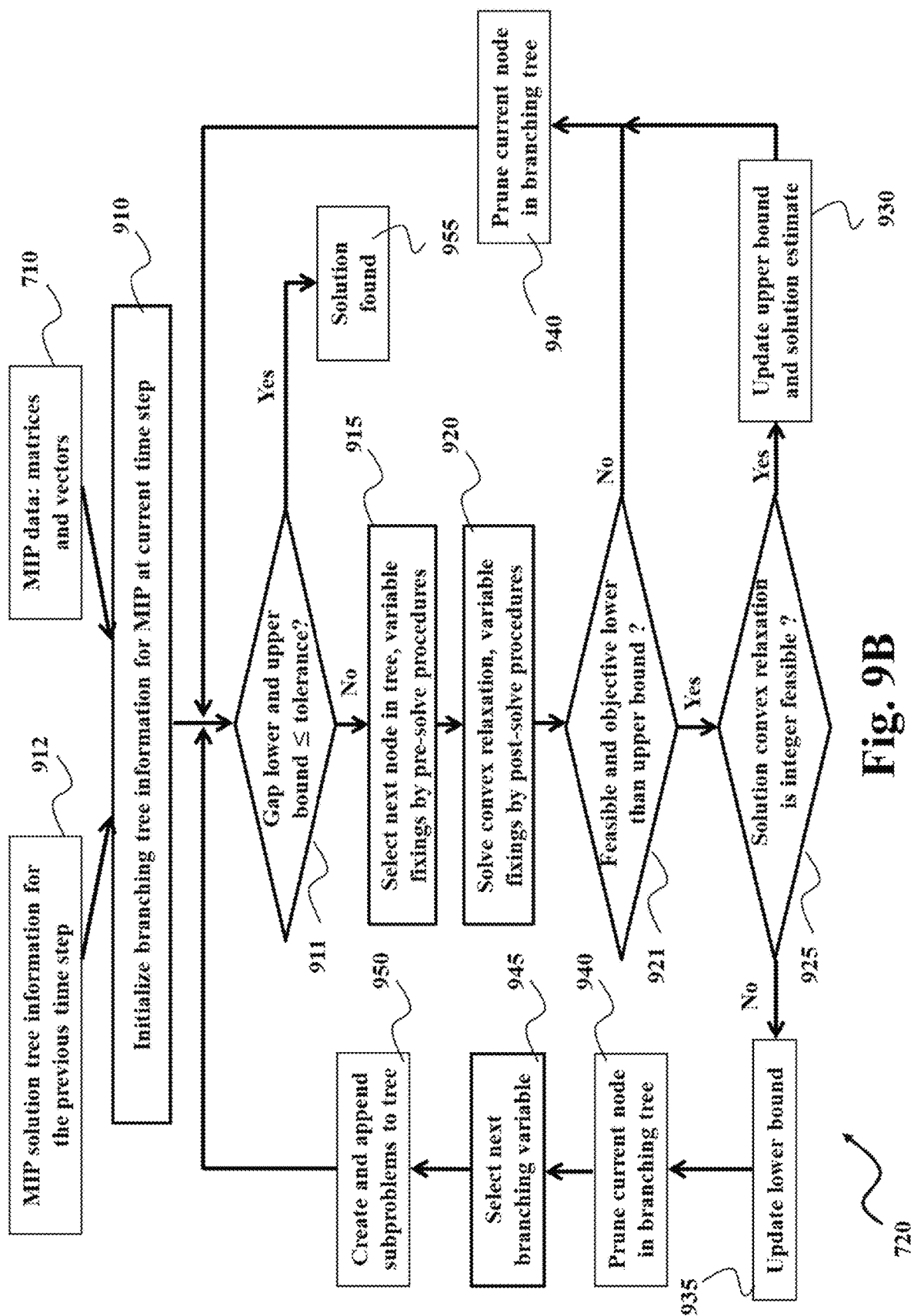
FIG. 9B illustrates a block diagram of a branch-and-bound mixed-integer optimization algorithm to search for the integer-feasible optimal decision making solution, based on a nested tree of search regions and corresponding lower/upper bound values, according to some embodiments of the invention.

FIG. 9B illustrates a block diagram of a branch-and-bound mixed-integer optimization algorithm to search for the integer-feasible optimal solution based on a nested tree of search regions and corresponding lower/upper bound values, according to some embodiments. The block diagram of a branch-and-bound mixed-integer optimization algorithm illustrated in FIG. 9B can be used to implement the global multi-vehicle decision making system in some embodiments. The branch-and-bound method initializes the branching search tree information for the mixed-integer program (MIP) at the current time step 910 of the global multi-vehicle decision making system, based on the MIP data 710 that consists of matrices and vectors. The initialization can additionally use the branching search tree information and MIP solution information from the previous time step 912 in order to generate a warm started initialization for the current time step 910. The main goal of the optimization algorithm is to construct lower and upper bounds on the objective value of the mixed-integer solution. At step 911, if the gap between the lower and upper bound value is smaller than a particular tolerance value, then the mixed-integer optimal solution 955 is found.

As long as the gap between the lower and upper bound value is larger than a particular tolerance value at step 911, and a maximum execution time is not yet reached by the optimization algorithm, then the branch-and-bound method continues to search iteratively for the mixed-integer optimal solution 955. Each iteration of the branch-and-bound method starts by selecting the next node in the tree, corresponding to the next region or partition of the integer variable search space, with possible variable fixings based on pre-solve branching techniques 915. After the node selection, the corresponding integer-relaxed problem is solved, with possible variable fixings based on post-solve branching techniques 920.

If the integer-relaxed problem has a feasible solution, then the resulting relaxed solution provides a lower bound on the objective value for that particular region or partition of the integer variable search space. At step 921, if the objective is determined to be larger than the currently known upper bound for the objective value of the optimal mixed-integer solution, then the selected node is pruned or removed from the branching tree 940. However, at step 921, if the objective is determined to be lower than the currently known upper bound, and the relaxed solution is integer feasible 925, then the currently known upper bound and corresponding mixed-integer solution estimate is updated at step 930.

If the integer-relaxed problem has a feasible solution and the objective is lower than the currently known upper bound 921, but the relaxed solution is not yet integer feasible, then the global lower bound for the objective can be updated 935 to be the minimum of the objective values for the remaining leaf nodes in the branching tree and the selected node is pruned from the tree 940. In addition, starting from the current node, a discrete variable with a fractional value is selected for branching according to a particular branching strategy 945, in order to create and append the resulting subproblems, corresponding to regions or partitions of the discrete search space, as children of that node in the branching tree 950.

An important step in the branch-and-bound method is how to create the partitions, i.e., which node to select 915 and which discrete variable to select for branching 945. Some embodiments are based on branching one of the binary optimization variables with fractional values in the integer-relaxed solution. For example, if a particular binary optimization variable $d \in \{0,1\}$ has a fractional value as part of the integer-relaxed optimal solution, then some embodiments create two partitions of the mixed-integer program by adding, respectively, the equality constraint $d=0$ to one subproblem and the equality constraint $d=1$ to the other subproblem. Some embodiments are based on a reliability branching strategy for variable selection 945, which aims to predict the future branching behavior based on information from previous branching decisions.

Some embodiments are based on a branch-and-bound method that uses a depth-first node selection strategy, which can be implemented using a last-in-first-out (LIFO) buffer. The next node to be solved is selected as one of the children of the current node and this process is repeated until a node is pruned, i.e., the node is either infeasible, optimal or dominated by the currently known upper bound value, which is followed by a backtracking procedure. Instead, some embodiments are based on a branch-and-bound method that uses a best-first strategy that selects the node with the currently lowest local lower bound. Some embodiments employ a combination of the depth-first and best-first node selection approach, in which the depth-first node selection strategy is used until an integer-feasible solution is found, followed by using the best-first node selection strategy in the subsequent iterations of the branch-and-bound based optimization algorithm. The latter implementation is motivated by aiming to find an integer-feasible solution early at the start of the branch-and-bound procedure (depth-first) to allow for early pruning, followed by a more greedy search for better feasible solutions (best-first).

The branch-and-bound method continues iterating until either one or multiple of the following conditions have been satisfied:

The maximum execution time for the processor is reached.

All the nodes in the branching search tree have been pruned, such that no new node can be selected for solving convex relaxations or branching.

The optimality gap between the global lower and upper bound value for the objective of the mixed-integer solution is smaller than the tolerance.

Figure 10:
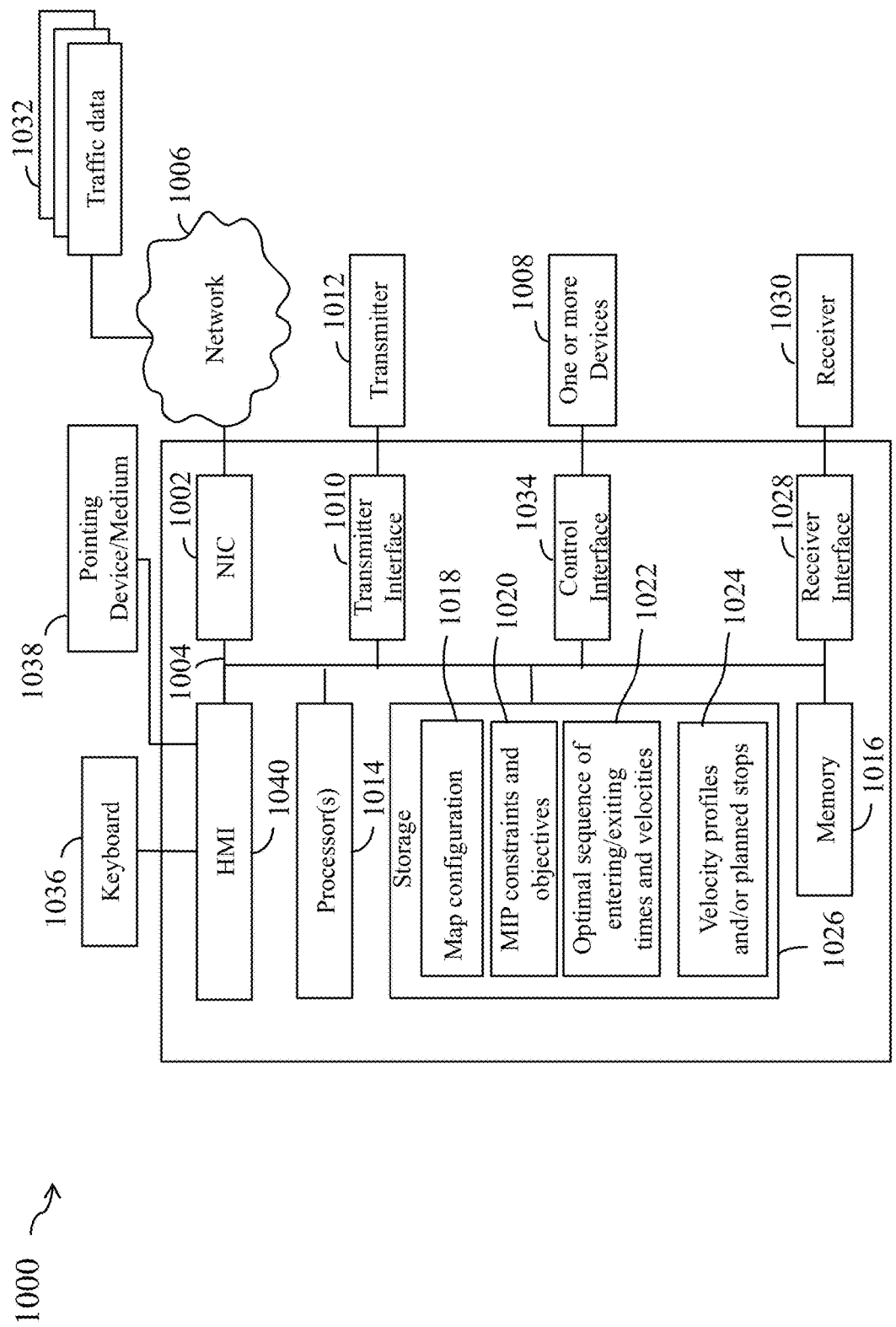
FIG. 10 shows a block diagram of a global multi-vehicle decision making system for computing a motion plan for one or multiple controlled vehicles in a transportation network of one or multiple interconnected conflict zones, according to some embodiments of the invention.

FIG. 10 shows a block diagram of a global multi-vehicle decision making system 1000 for computing a motion plan for one or multiple controlled vehicles in a transportation network of one or multiple interconnected conflict zones, according to some embodiments of the invention. The global multi-vehicle decision making system 1000 is executed either in the cloud or in one or multiple mobile edge computers (MECs). The system may additionally require one or multiple edge devices (e.g., RSUs for infrastructure-based sensing) comprised of a set of sensors or be operatively connected to the set of sensors to collect traffic information near one or multiple interconnected conflict zones in the transportation network. In some embodiments of the invention, the global multi-vehicle decision making system is designed to transmit an optimal sequence of entering and exiting times and average velocities 1022 and/or a velocity profile and sequence of planned stops 1024 to each of the connected and automated vehicles (CAVs) along its future planned route in the transportation network.

The global multi-vehicle decision making system 1000 comprises a number of interfaces connecting the decision making system 1000 with other systems and devices. For example, the decision making system 1000 comprises a network interface controller (NIC) 1002 that is adapted to connect the decision making system 1000 through a bus 1004 to a network 1006 connecting the decision making system 1000 with one or more devices 1008. Examples of such devices include, but are not limited to, vehicles, traffic lights, traffic sensors, road-side units (RSUs), mobile edge computers (MECs), and passengers' mobile devices. Further, the decision making system 1000 includes a transmitter interface 1010, using a transmitter 1012 and/or one or multiple of the devices 1008, configured to transmit an optimal sequence of entering and exiting times and average velocities 1022 and/or a velocity profile and sequence of planned stops 1024, determined by one or multiple processors 1014, to each of the connected and automated vehicles (CAVs) along its future planned route in the transportation network. In each of the CAVs, the commands received from the global multi-vehicle decision making system can be used by a multi-layer guidance and control architecture to control the motion of the vehicle in order to improve overall safety, time and energy efficiency of the traffic flow in the transportation network.

Through the network 1006, the global multi-vehicle decision making system 1000 receives real-time traffic data 1032 using a receiver interface 1028 connected to a receiver 1030. The decision making system 1000 can receive traffic information for one or multiple of the interconnected conflict zones and road segments in the transportation network. The traffic data 1032 can include information of vehicle states (e.g., acceleration, location, heading, velocity) and of planned and/or predicted future routes (e.g., sequence of future road segments, track lanes, desired destinations, waiting times) for each of the vehicles in the transportation network. Additionally, or alternatively, the decision making system 1000 can include a control interface 1034 configured to transmit commands to the one or multiple devices 1008 to change their respective state, such as acceleration, velocity, and the like. The control interface 1034 may use the transmitter 1012 to transmit the commands and/or any other communication means.

In some embodiments of the invention, a human machine interface (HMI) 1040 connects the decision making system 1000 to a keyboard 1036 and pointing device 1038, wherein the pointing device 1038 can include a mouse, trackball, touchpad, joy stick, pointing stick, stylus, or touchscreen, among others. The decision making system 1000 can also be linked through the bus 1004 to a display interface adapted to connect the decision making system 1000 to a display device, such as a computer monitor, camera, television, projector, or mobile device, among others. The decision making system 1000 can also be connected to an application interface adapted to connect the decision making system 1000 to one or more equipment for performing various power distribution tasks.

The decision making system 1000 can include one or multiple processors 1014 configured to execute stored instructions, as well as a memory (at least one memory) 1016 that stores instructions that are executable by the processor (at least one processor) 1014. The processor(s) 1014 can be a single core processor, a multi-core processor, a computing cluster, a network of multiple connected processors, or any number of other configurations. The memory 1016 can include random access memory (RAM), read only memory (ROM), flash memory, or any other suitable memory systems. The processor(s) 1014 can be connected through the bus 1004 to one or more input and output devices. These instructions implement a method for global multi-vehicle decision making in a local area of interconnected conflict zones. In some embodiments of the invention, the decision making system 1000 includes a map configuration 1018. For example, the map configuration 1018 can include location data (e.g., GPS data) for conflict-free road segments, conflict zones and track lanes within each of the road segments of the transportation network.

The decision making system 1000 includes constraints and objectives 1020 of the mixed-integer programming (MIP) problem 720 that is solved at each time step of the global multi-vehicle decision making system, e.g., as described in FIG. 8A-8D. For example, the MIP constraints and objectives 1020 can be configured to enforce physical limitations, vehicle speed limits and/or safety constraints, and to minimize a weighted combination of travel times, waiting times and/or energy consumption for each of the vehicles in the transportation network. In some embodiments of the invention, the MIP constraints and objectives 1020 lead to the solution of a mixed-integer linear programming (MILP) or a mixed-integer quadratic programming (MIQP) problem. Based on the MIP solution, an optimal sequence of entering and exiting times and average velocities 1022 and/or a velocity profile and sequence of planned stops 1024, can be determined by one or multiple processors 1014 for each of the connected and automated vehicles (CAVs) along its future planned or predicted route in the transportation network.

Figure 11A:
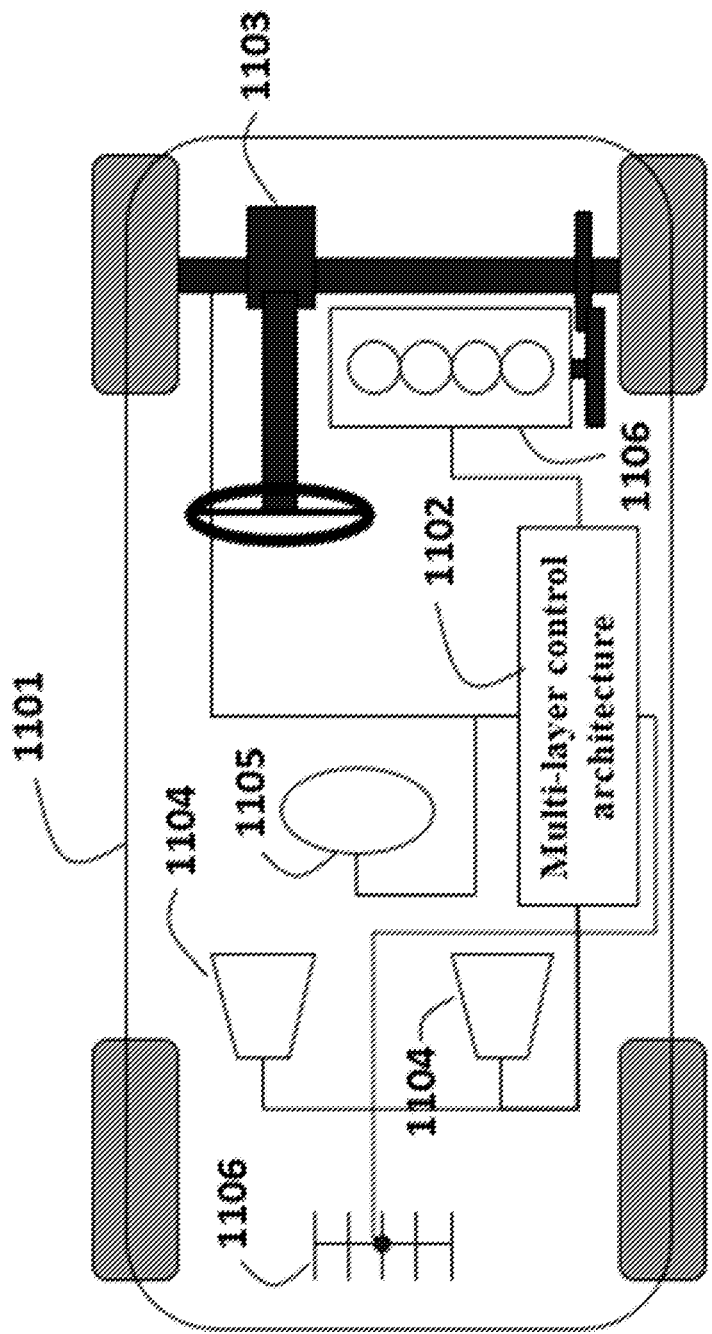
FIG. 11A illustrates a schematic of a vehicle including a multi-layer guidance and control architecture employing principles of some embodiments.

FIG. 11A illustrates a schematic of a vehicle 1101 including a multi-layer guidance and control architecture 1102 that controls the motion of the vehicle based on a future route plan and a corresponding motion plan that can be computed by a global multi-vehicle decision making system for the transportation network, according to some embodiments of the invention. As used herein, the vehicle 1101 can be any type of wheeled vehicle, such as a passenger car, truck, shuttle, bus, or rover. Also, the vehicle 1101 can be an autonomous or semi-autonomous vehicle. For example, some embodiments control the motion of the vehicle 1101, based on a motion plan that can be computed by a global multi-vehicle decision making system. Examples of the motion include lateral motion of the vehicle controlled by a steering system 1103 of the vehicle 1101. In some embodiments of the invention, the steering system 1103 is controlled by the multi-layer guidance and control architecture 1102. Additionally or alternatively, the steering system 1103 can be controlled by a (human) driver of the vehicle 1101.

The vehicle can also include an engine 1106, which can be controlled directly by the multi-layer guidance and control architecture 1102 or by other components of the vehicle 1101. The vehicle can also include one or more on-board sensors 1104 to sense the surrounding environment. Examples of the sensors 1104 include distance range finders, radars, lidars, and cameras. The vehicle 1101 can also include one or more on-board sensors 1105 to sense its current motion quantities and internal status. Examples of the sensors 1105 include global positioning system (GPS), accelerometers, inertial measurement units, gyroscopes, shaft rotational sensors, torque sensors, deflection sensors, pressure sensors, and flow sensors. The on-board sensors provide information to the multi-layer guidance and control architecture 1102. The vehicle can be equipped with a transceiver 1106 enabling communication capabilities for the multi-layer guidance and control architecture 1102 through wired or wireless communication channels, e.g., for the vehicle 1101 to communicate with the global multi-vehicle decision making system, according to some embodiments of the invention.

Figure 11B:
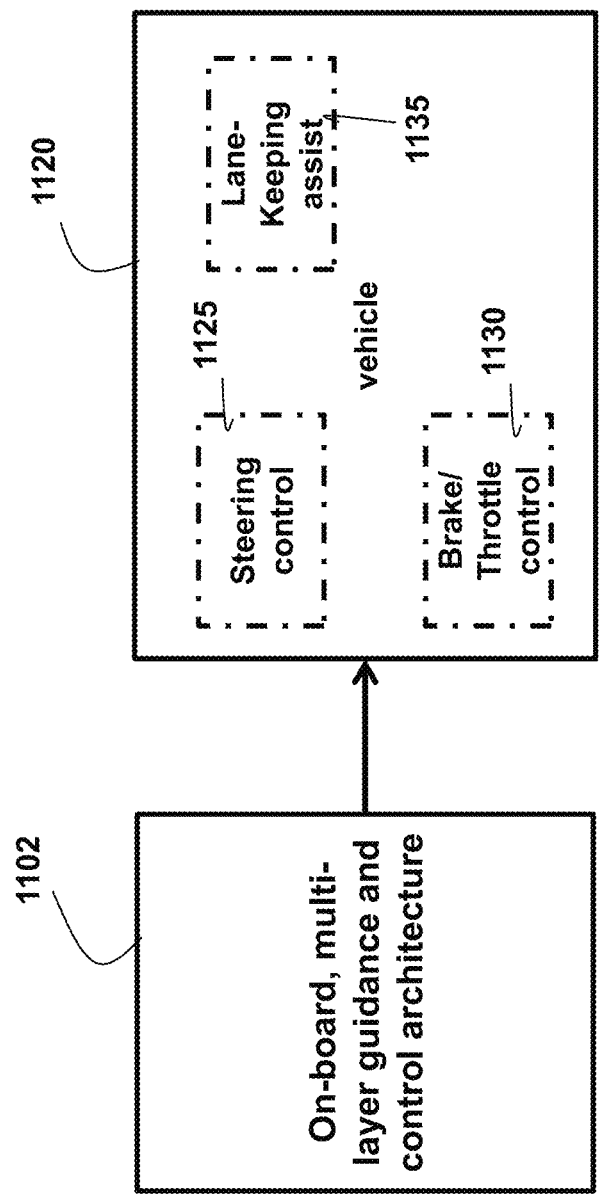
FIG. 11B illustrates a schematic of interaction between the multi-layer guidance and control architecture and other controllers of the vehicle, according to some embodiments of the invention.

FIG. 11B illustrates a schematic of interaction between the multi-layer guidance and control architecture 1102 (i.e., layers of algorithms and technologies for decision making, motion planning, vehicle control and/or estimation) and other controllers 1120 of the vehicle 1101, according to some embodiments of the invention. For example, in some embodiments, the controllers 1120 of the vehicle 1101 are steering 1125 and brake/throttle controllers 1130 that control rotation and acceleration of the vehicle 1120, respectively. In such a case, the multi-layer guidance and control architecture 1102 outputs control inputs to the controllers 1125 and 1130 to control the state of the vehicle 1101. The controllers 1120 can also include high-level controllers, e.g., a lane-keeping assist controller 1135, that further process the control inputs of the multi-layer guidance and control architecture 1102. In both cases, the controllers 1120 use the outputs of the multi-layer guidance and control architecture 1102 to control at least one actuator of the vehicle 1101, such as the steering wheel and/or the brakes of the vehicle 1101, in order to control the motion of the vehicle 1101. In some embodiments of the invention, the vehicle 1101 is one of multiple CAVs in a transportation network, and the multi-layer guidance and control architecture 1102 determines an input to the vehicle 1101 based on a motion plan that is computed by a global multi-vehicle decision making system, where the input to the vehicle 1101 can include one or a combination of an acceleration of the vehicle 1101, an engine torque of the vehicle 1101, brake torques, and a steering angle.

Figure 12A:
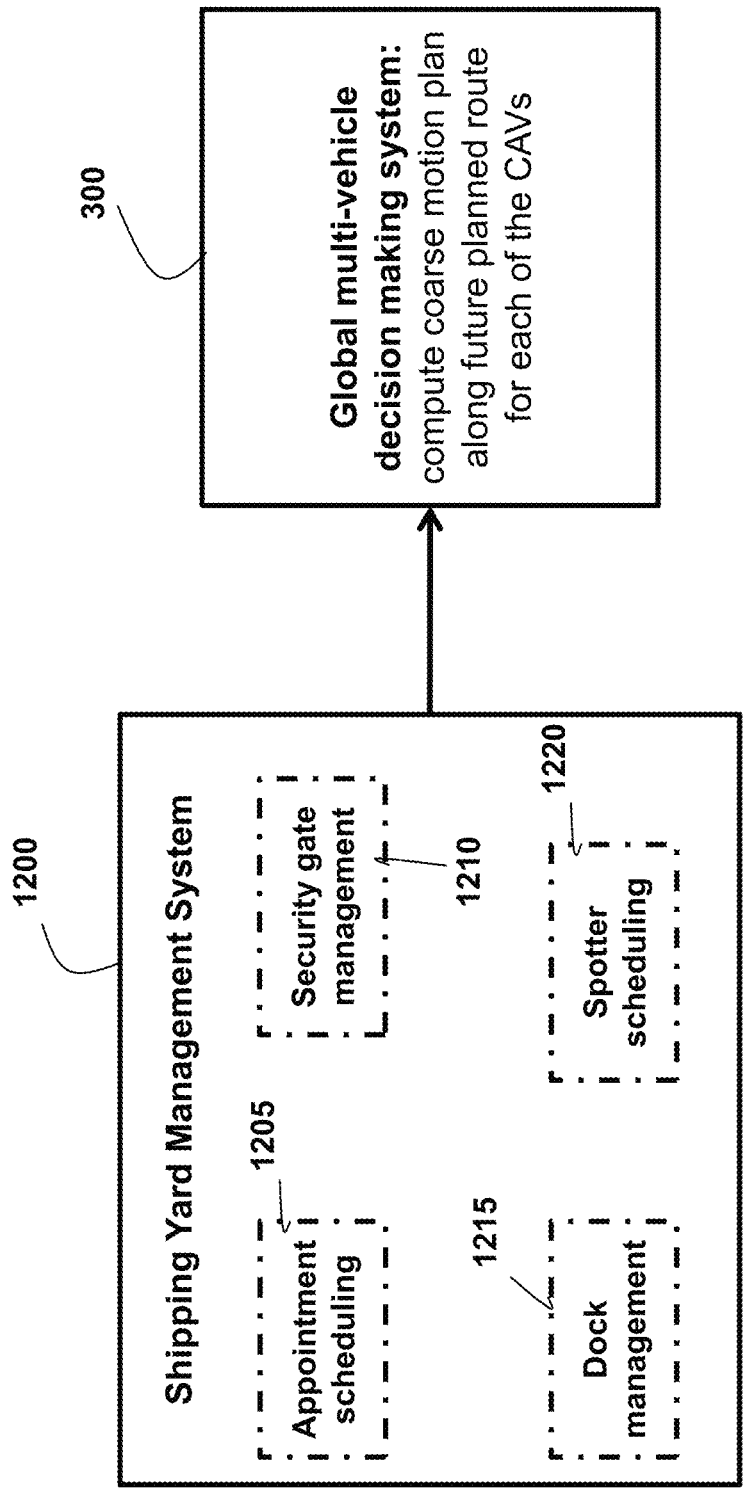
FIG. 12A illustrates a schematic of interaction between a shipping yard management system and the global multi-vehicle decision making system, according to some embodiments of the invention.

FIG. 12A illustrates a schematic of interaction between the global multi-vehicle decision making system 300 and a shipping yard management system 1200 that can be used in combination with each other for efficient job scheduling, motion planning and decision making for controlled and non-controlled vehicles in a shipping yard. In some embodiments of the invention, the shipping yard management system computes a task assignment and planned route for one or multiple trucks and/or spotters to perform one or multiple of the following tasks

- route plan towards one or multiple docks for loading or unloading of one or multiple trailers by one or multiple dock workers;
- route plan for moving one or multiple trailers from one location in the shipping yard to another location;
- route plan towards a particular lot in a parking area for fetching or dropping off of one or multiple trailers in the parking area;
- route plan for entering and exiting the interconnected transportation network of the shipping yard area.

In some embodiments of the invention, among other components, the shipping yard management system can include one or multiple of the following components; appointment scheduling 1205, security gate management 1210, dock management 1215 and spotter scheduling 1220. The appointment scheduling 1205 system ensures that an appointment is made for each truck that is scheduled to arrive at the shipping yard for loading or unloading of its cargo. The security gate management 1210 system performs the check-in of each truck, with or without driver, possibly in combination with a security or verification process. The security gate management system ensures that both the shipping yard management system 1200 and the global multi-vehicle decision making system 300 is aware of all trucks and drivers that are currently present in the shipping yard area. The dock management 1215 system is based on a task assignment or job scheduling system that decides which particular dock can be used for loading or unloading of cargo in a particular trailer, by one or multiple dock workers. The spotter scheduling 1220 system decides whether a particular spotter should be instructed to fetch a trailer to move it to a particular parking lot or a particular dock in the shipping yard.

In some embodiments of the invention, the task assignment, job scheduling, mapping and/or navigation of the shipping yard management system can be implemented by solution of a mixed-integer programming (MIP) problem. The MIP for task assignment or job scheduling can be solved either separately or together with the MIP for motion planning in the global multi-vehicle decision making system, for example, using one or multiple mobile edge computers. In other embodiments of the invention, the task assignment or job scheduling of the shipping yard management system can be implemented based on a heuristic search technique to compute a feasible but possibly suboptimal schedule at a considerably reduced computational cost for shipping yard management.

Figure 12B:
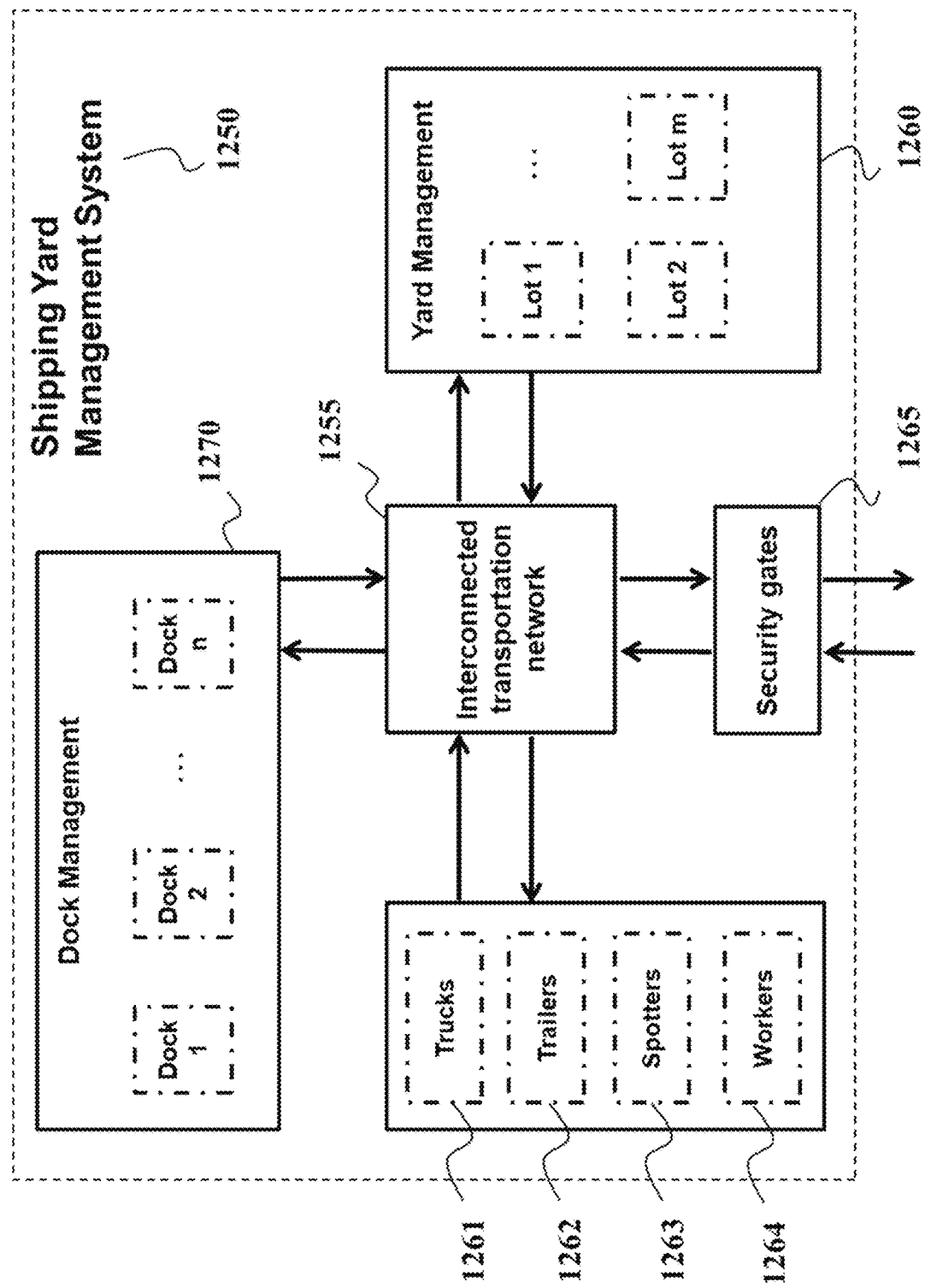
FIG. 12B illustrates an example of a shipping yard management system, consisting of one or multiple components, according to some embodiments of the invention.

FIG. 12B illustrates a schematic of a shipping yard management system 1250 that includes an interconnected transportation network 1255 for one or multiple vehicles to travel within the shipping yard area between the security gates 1265, one or multiple parking lots 1260 and one or multiple docks 1270. The shipping yard management system aims to organize the movement of trucks within the yard of a manufacturing facility, warehouse or distribution center. In some embodiments of the invention, each of the vehicles can be either automated or semi-automated (CAV) or a non-controlled vehicle (NCVs), and each of the vehicles can be either a truck 1261, with or without trailer 1262, a spotter 1263 or yard jockey. The shipping yard management system 1250 assigns each of the tasks to one or multiple of the trucks 1261, trailers 1262, spotters 1263 or dock workers 1264, as well as to one or multiple of the parking lots 1260 or docks 1270. The task assignment results can be communicated to one or multiple of the dock workers 1264 as well as to one or multiple of the trucks 1261 and spotters 1263, and/or to one or multiple drivers of the trucks 1261 and spotters 1263. For example, vehicle-to-everything (V2X) communication equipment and technologies can be used, in combination with electronic communication between the shipping yard management system and a mobile device or computer that can be held by one or multiple of the dock workers and/or drivers. The global multi-vehicle decision making system then computes a coarse motion plan within the interconnected transportation network for each of the CAVs and NCVs along its planned or predicted route to perform the tasks within the shipping yard.

Some embodiments of the invention are based on the realization that a hierarchy of priority levels may exist between each of the vehicles, due to the particular task that was assigned to each of the vehicles by the shipping yard management system. In some embodiments of the invention, the global multi-vehicle decision making system is based on the solution of an MIP problem based on a weighted multi-objective minimization to compute a motion plan that provides priority to one or multiple vehicles with a higher priority level, as decided by the shipping yard management system. For example, the weight values for travel times and/or waiting times of one or multiple vehicles with a higher priority level can be chosen to be relatively large in the weighted multi-objective minimization of the MIP problem in the global multi-vehicle decision making system.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Also, the embodiments of the invention may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments.

Although the invention has been described by way of examples of preferred embodiments, it is to be understood that various other adaptations and modifications can be made within the spirit and scope of the invention. Therefore, it is the object of the appended claims to cover all such variations and modifications as come within the true spirit and scope of the invention.

We claim:

1. A global multi-vehicle decision making system for providing real-time motion planning and coordination of one or multiple connected and automated and/or semi-automated vehicles (CAVs) in an interconnected traffic network that includes one or multiple non-controlled vehicles (NCVs), one or multiple conflict zones and one or multiple conflict-free road segments, comprising:
    a receiver configured to acquire infrastructure sensing signals via road-side units (RSUs), type 1 feedback signals on state and planned future routing information towards one or multiple desired destinations for connected and automated vehicles (CAVs), and type 2 feedback signals on state and predicted future routing information for non-controlled vehicles (NCVs), wherein the receiver performs data communication with a shipping yard management system, wherein the shipping yard management system includes a centralized task assignment, job scheduling, mapping and navigation system that is connected to the global multi-vehicle decision making system to provide the map information, the long-term planned future routing information for one or multiple CAVs, and/or the short-term predicted future routing information for one or multiple NCVs;
    at least one memory configured to store map information and computer-executable programs including a global multi-vehicle decision making program; and
    at least one processor, in connection with the at least one memory, configured to perform steps of:
        formulating a global mixed-integer programming (MIP) problem based on the infrastructure sensing signals, the type 1 and type 2 feedback signals and the map information, wherein the MIP problem performs a weighted multi-objective minimization that ensures a hierarchy of priority levels between each of the vehicles that perform a task within the interconnected transportation network of the shipping yard, by choosing large weight values for travel times and/or waiting times of one or multiple vehicles with a higher priority level;
        computing a motion plan for each CAV and each NCV in an interconnected traffic network by solving the global MIP problem, wherein the motion plan is computed for one or multiple trucks, spotters or yard jockeys, wherein each of the one or multiple trucks, the spotters or the yard jockeys is either a controlled or non-controlled vehicle along a route within a shipping yard for efficient loading and/or unloading of cargo;
        computing an optimal sequence of entering and exiting times and a sequence of average velocities for each CAV and each NCV in each road segment along a planned or predicted future route within a transportation network;
        computing a velocity profile and/or one or multiple planned stops for each CAV over a prediction time horizon; and
    a transmitter configured to transmit, to each of the CAVs, the velocity profile and/or the one or multiple planned stops to a multi-layer guidance and control architecture of each CAV in the interconnected traffic network.

2. The global multi-vehicle decision making system of claim 1, wherein the conflict zones include one or multiple merging points and/or traffic intersections, which physically connect multiple lanes in multiple road segments of the interconnected traffic network.

3. The global multi-vehicle decision making system of claim 1, wherein the receiver acquires the type 1 feedback signals from one or multiple CAVs and/or one or multiple RSUs using vehicle-to-everything (V2X) communication.

4. The global multi-vehicle decision making system of claim 1, wherein the receiver acquires the type 2 feedback signals from one or multiple NCVs and/or one or multiple RSUs using vehicle-to-everything (V2X) communication.

5. The global multi-vehicle decision making system of claim 1, wherein the global multi-vehicle decision making program is executed in a receding horizon implementation by one or multiple processors in one or multiple mobile edge computers (MECs).

6. The global multi-vehicle decision making system of claim 1, wherein the global multi-vehicle decision making program is executed in a receding horizon implementation by one or multiple processors in a cloud-based computing system.

7. The global multi-vehicle decision making system of claim 1, wherein a centralized task assignment, mapping and navigation system is connected to the global multi-vehicle decision making system to provide the map information, the long-term planned future routing information for one or multiple CAVs, and/or the short-term predicted future routing information for one or multiple NCVs.

8. The global multi-vehicle decision making system of claim 1, wherein safety constraints with respect to dynamic traffic participants, including bicycles and pedestrians, are enforced by on-board modules for motion planning and/or vehicle control in the multi-layer guidance and control architecture for each CAV.

9. The global multi-vehicle decision making system of claim 1, wherein the infrastructure sensing signals include signals from one or multiple sensors, e.g., including distance range finders, radars, lidars, and/or cameras.

10. The global multi-vehicle decision making system of claim 1, wherein the state information in the type 1 feedback signals for CAVs and the state information in the type 2 feedback signals for NCVs include a current position, a current heading angle and/or a current velocity of each vehicle.

11. The global multi-vehicle decision making system of claim 1, wherein the map information includes location data for conflict-free road segments, for conflict zones, including one or multiple merging points and/or traffic intersections, and for one or multiple track lanes within each of the road segments and each of the conflict zones of the transportation network.

12. The global multi-vehicle decision making system of claim 11, wherein the planned or predicted future routing information in the type 1 and type 2 feedback signals include a sequence of future road segments and future track lanes within these road segments for each vehicle towards a desired destination, starting from the road segment and track lane in which the vehicle is currently located.

13. The global multi-vehicle decision making system of claim 1, wherein the MIP problem is a mixed-integer linear programming (MILP) or a mixed-integer quadratic programming (MIQP) problem and the optimization variables include entering and exiting time variables, inverse average velocity variables and one or multiple binary optimization variables for each of the CAVs and each of the NCVs in each of the road segments and conflict zones of the transportation network.

14. The global multi-vehicle decision making system of claim 13, wherein the MIP problem includes vehicle dynamics equality constraints and one or multiple velocity limit constraints for each of the CAVs and/or NCVs.

15. The global multi-vehicle decision making system of claim 13, wherein the MIP problem includes vehicle routing inequality constraints to enforce an order between exiting and entering subsequent road segments in the planned or predicted future route for each of the CAVs and each of the NCVs.

16. The global multi-vehicle decision making system of claim 13, wherein the MIP problem includes one or multiple safety constraints for each of the conflict zones in the transportation network, to avoid potential collisions in the motion plan by enforcing that a pair of vehicles is not allowed to be driving on conflicting track lanes in the same conflict zone at the same time.

17. The global multi-vehicle decision making system of claim 16, wherein the safety constraints are implemented using one binary optimization variable for each pair of vehicles and for each of the conflict zones in the transportation network based on a big-M formulation in a set of mixed-integer linear inequality constraints of the MIP problem.

18. The global multi-vehicle decision making system of claim 13, wherein the MIP problem includes one or multiple occupancy constraints for each of the road segments in the transportation network, to enforce a fixed order between any pair of vehicles that are planned or predicted to drive on the same track lane within the same road segment.

19. The global multi-vehicle decision making system of claim 18, wherein the occupancy constraints are implemented using one binary optimization variable for each pair of vehicles and for each of the road segments in the transportation network based on a big-M formulation in a set of mixed-integer linear inequality constraints of the MIP problem.

20. The global multi-vehicle decision making system of claim 13, wherein the MIP problem performs a weighted multi-objective minimization that includes a weighted sum of one or multiple objective terms to minimize a weighted combination of travel times, waiting times and/or energy consumption for each of the vehicles in the transportation network.

21. The global multi-vehicle decision making system of claim 1, wherein the MIP problem is solved using a branch-and-bound, branch-and-cut or branch-and-price optimization algorithm.

22. The global multi-vehicle decision making system of claim 1, wherein the motion plan is computed by using a heuristic optimization algorithm to compute a feasible but suboptimal solution to the MIP problem based on integer rounding schemes, the feasibility pump, approximate optimization algorithms, or the use of machine learning techniques.

* * * * *